(12) United States Patent
Dahm et al.

(10) Patent No.: US 8,528,601 B2
(45) Date of Patent: Sep. 10, 2013

(54) PASSIVE BOUNDARY LAYER CONTROL ELEMENTS

(75) Inventors: Werner J. A. Dahm, Ann Arbor, MI (US); Andrew P. Lapsa, Seattle, WA (US)

(73) Assignee: The Regents of The University of Michigan, Ann Arbor, MI (US)

( * ) Notice: Subject to any disclaimer, the term of this patent is extended or adjusted under 35 U.S.C. 154(b) by 459 days.

(21) Appl. No.: 12/748,699

(22) Filed: Mar. 29, 2010

(65) Prior Publication Data

US 2010/0288379 A1 Nov. 18, 2010

Related U.S. Application Data

(60) Provisional application No. 61/164,699, filed on Mar. 30, 2009, provisional application No. 61/211,540, filed on Mar. 31, 2009.

(51) Int. Cl.
*B64C 23/06* (2006.01)
*B64C 21/10* (2006.01)

(52) U.S. Cl.
USPC ...... 137/809; 244/130; 244/199.1; 244/200.1

(58) Field of Classification Search
USPC ................. 137/808, 809; 296/180.1–180.5; 244/130, 199.1, 200, 200.1
See application file for complete search history.

(56) References Cited

U.S. PATENT DOCUMENTS

| | | | |
|---|---|---|---|
| 2,800,291 A * | 7/1957 | Stephens | 244/200 |
| 3,578,264 A | 5/1971 | Kuethe | |
| 3,741,285 A | 6/1973 | Kuethe | |
| 4,455,045 A | 6/1984 | Wheeler | |
| 4,696,442 A | 9/1987 | Mazzitelli | |
| 5,056,627 A | 10/1991 | Pelto-Huikko | |
| 5,058,837 A | 10/1991 | Wheeler | |
| 5,074,234 A * | 12/1991 | Stearns, IV | 114/102.13 |
| 2004/0037162 A1 * | 2/2004 | Flohr et al. | 366/181.5 |

* cited by examiner

*Primary Examiner* — Craig Schneider
(74) *Attorney, Agent, or Firm* — Harness, Dickey & Pierce, P.L.C.

(57) ABSTRACT

Sub-boundary-layer-scale ramp-like vortex generators that can be mounted on any surface such as the wing of an airplane, the inlet to a propulsion system, the hull of a ship, or any other surface over which a fluid moves, when the objective is to minimize drag, irreversibility losses, or other performance penalties that can occur for reasons such as boundary layer separation or other undesirable boundary layer properties. The disclosed devices acts to passively induce streamwise vortices in the boundary layer, thereby transferring high-momentum fluid toward the surface in such a way as to alter the shape of the velocity profile within the boundary layer and thereby avoid or delay separation or alter other properties of the boundary layer.

11 Claims, 32 Drawing Sheets

PASSIVE BOUNDARY LAYER CONTROL ELEMENTS

CROSS-REFERENCE TO RELATED APPLICATIONS

This application claims the benefit of U.S. Provisional Application No. 61/164,699, filed on Mar. 30, 2009 and U.S. Provisional Application No. 61/211,540, filed on Mar. 31, 2009. The entire disclosure of each of the above applications is incorporated herein by reference.

GOVERNMENT INTEREST

This invention was made with government support under Grant No. FA8650-06-2-2625 awarded by the U.S. Air Force Research Laboratory. The government has certain rights in the invention.

FIELD

The present disclosure relates to vortex generators and, more particularly, relates to passive boundary layer control elements having a pair of cooperating micro ramps inducing vortices in a fluid that remain adjacent to a surface in response to their mutual Biot-Savart induced interaction.

BACKGROUND AND SUMMARY

This section provides background information related to the present disclosure which is not necessarily prior art. This section also provides a general summary of the disclosure, and is not a comprehensive disclosure of its full scope or all of its features.

Micro ramps have been proposed as passive boundary layer control features to reduce the boundary layer thickening and separation that are typical in a wide range of boundary layer control applications. Such features can produce vortices whose axes of rotation are aligned with the streamwise direction and pull high energy fluid from the free stream deep into the boundary layer to avoid separation and other unwanted effects. The more energetic boundary layer that results has a reduced shape factor and is less susceptible to thickening and separation produced by an adverse pressure gradient.

The standard micro ramp design, generally referred to at 100, was introduced by Anderson et al. and consists of triangular features as shown in FIG. 1. The flow, U, is initially deflected by the micro ramp 100 before it passes over angled dumps 102 on each side of the feature. As seen in FIG. 2, a counter-rotating vortex pair 104a, 104b is produced, the size and strength of which depends on the height of the feature h (FIG. 1) and the half-angle of the triangle $A_p$.

Still referring to FIG. 2, these counter-rotating vortices 104a, 104b are illustrated from a downstream location, looking in the upstream direction at the rearward faces of the micro ramp 100. Of critical importance is the behavior of these streamwise vortices 104a, 104b as they propagate downstream. Note that the effect, $F_{104b}$, of vortex 104b on vortex 104a is to push vortex 104a in the upward direction, and that the same is true for the effect, $F_{104a}$, of vortex 104a on vortex 104b. The effect of the wall 106 on the vortex pair 104a, 104b will be the same as the effect from an "image" vortex pair, which is a reflection of the real vortices across the wall. The image vortex pair is shown by the dotted lines in FIG. 2. It can then be seen that the effect of the wall 106 is to pull the vortex pair toward each other, which has the detrimental effect of causing the opposite-signed vorticity in the streamwise vortices 104a, 104b to interdiffuse and cancel, thereby reducing the vortex strengths as they propagate downstream.

Thus the effect of the vortex-vortex interaction in a conventional design is to drive the vortex pair 104a, 104b up out of the boundary layer, and the effect of the wall 106 is to pull the vortex pair together. Since the initially separate vortices are counter-rotating, the strength of vortex 104a cancels the strength of vortex 104b as the pair is drawn together. As the vortex pair propagates downstream, then, they are located in an undesirable position above or within the boundary layer with their strength diminished. It would be desirable for exactly the opposite interactions to take place as the vortices move downstream; the vortex pair should remain separated, remain close to the wall 106, and preferably remain within the boundary layer.

In other words, each individual micro ramp 100 creates a pair of streamwise vortices 104a, 104b that cause the resulting vortex pair to naturally lift upward as a consequence of the mutual Biot-Savart induced interaction between the two vortices. This in turn causes the vortices to quickly lift out of the boundary layer, reducing their efficacy in controlling the boundary layer. Moreover, the effect of the wall on the resulting streamwise vortices is a further Biot-Savart induced interaction with their image vortices that causes the vortices 104a, 104b to move toward each other and thereby reduce their strengths through interdiffusion, thus further reducing their efficacy in controlling the boundary layer. It is both these aspects of such prior art embedded passive boundary layer control devices that limit their efficacy, and that the disclosed new devices are able to overcome to achieve substantially greater efficacy.

According to the principles of the present teachings, in some embodiments, ramp-like vortex generators are provided that can be mounted on any surface such as the wing of an airplane, the inlet to a propulsion system, the hull of a ship, or any other surface over which a fluid moves, when the objective is to minimize drag, irreversibility losses, or other performance penalties that can occur for reasons such as boundary layer separation or other undesirable boundary layer properties. The disclosed devices act to passively induce streamwise vortices in the boundary layer, thereby transferring high-momentum fluid toward the surface in such a way as to alter the shape of the velocity profile within the boundary layer and thereby avoid or delay separation or alter other properties of the boundary layer. Moreover, the disclosed devices can achieve these beneficial effects with lower performance penalties than prior art devices can.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 7:
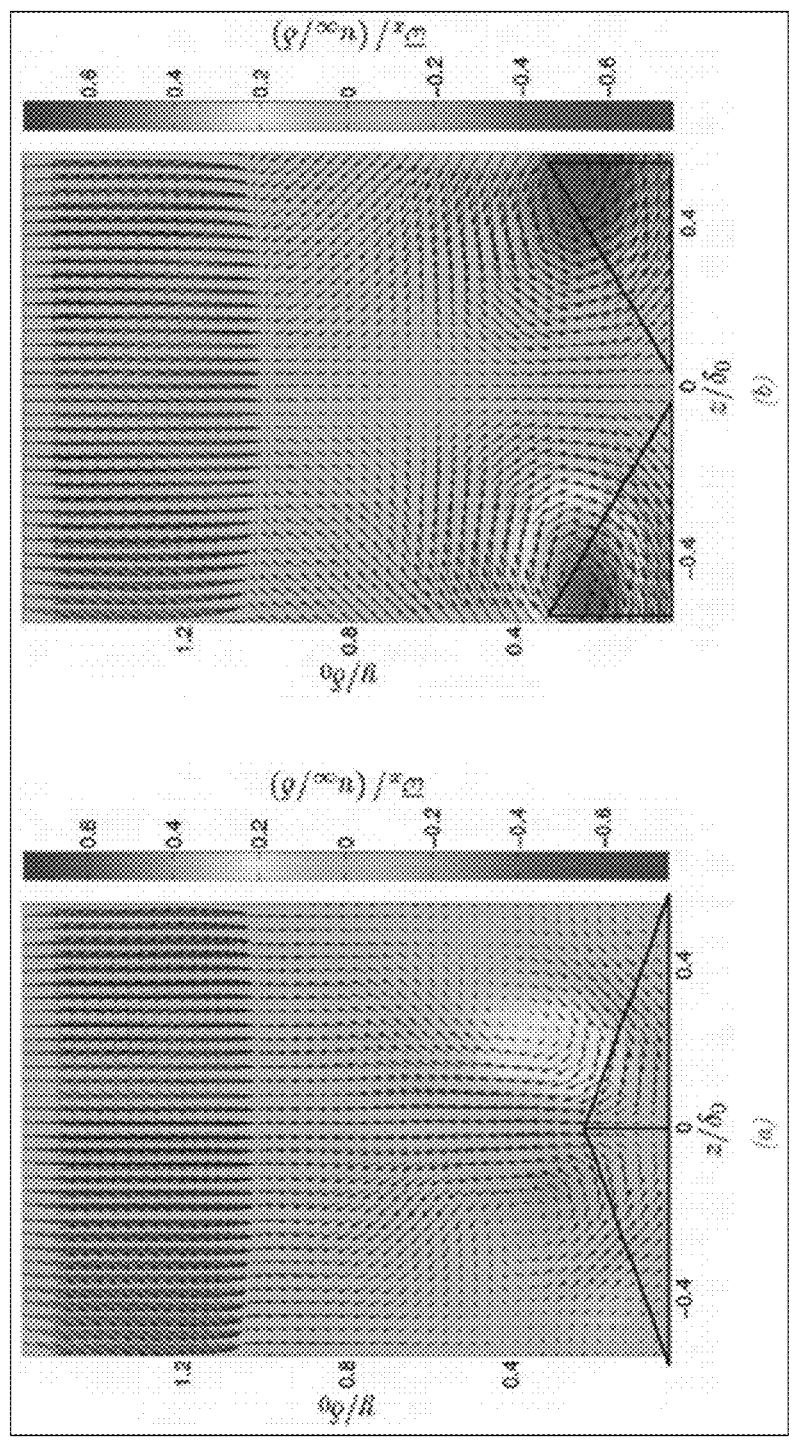

FIG. 7 illustrates typical mean vorticity fields $\bar{\omega}_\chi$, in this case located at $\chi/\delta_0 = -2.5$ upstream of a shock-boundary layer interaction (SBLI) having a $\theta = 7.75$-deg flow detection angle. FIG. 7 shows the streamwise vortex pair generated by (a) the standard micro ramp and (b) the inverse micro ramp. Superimposed on the vector fields are scale representations of the ramp outlines.

Figure 8:
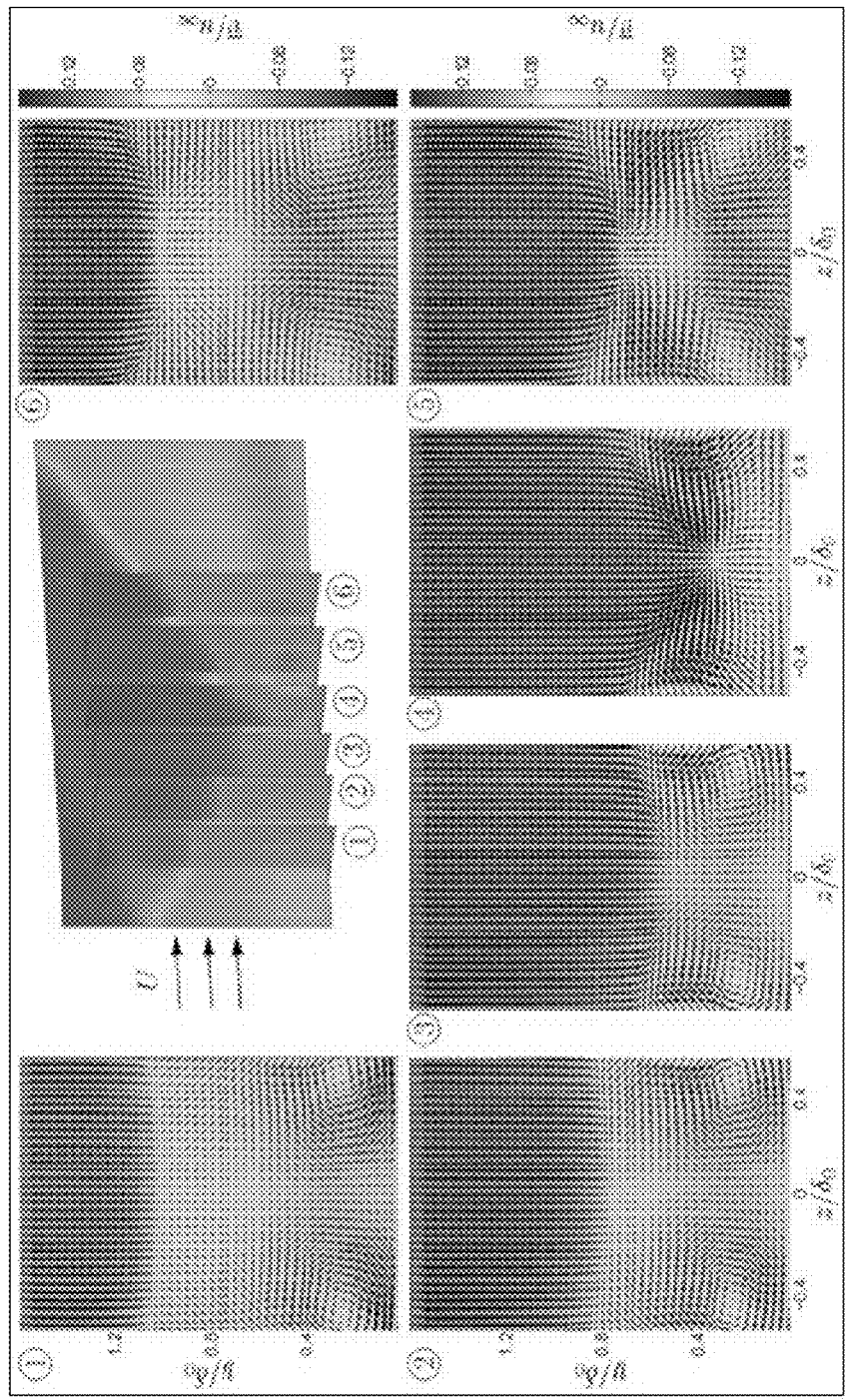

FIG. 8 illustrates color plots of $\bar{\omega}_\chi$ showing the vortex interaction region in transverse planes in this instance for an example application comprising a shock-boundary layer interaction with an incident shock wave that produces a flow deflection angle of $\theta = 7.75$-deg and passive control via inverse micro-ramps located at $\chi/\delta_0 = -8.50$. The averaged in-plane velocity fields $(\bar{v},\bar{w})$ are overlayed as vectors. The six sampling locations correspond to 1: $\chi/\delta_0 = -2.0$, 2: $\chi/\delta_0 = -1.55$, 3: $\chi/\delta_0 = -1.2$, 4: $\chi/\delta_0 = -0.7$, 5: $\chi/\delta_0 = -0.2$, and 6: $\chi/\delta_0 = +0.3$. The central perspective plot shows the relative locations of each plane.

Figure 9:
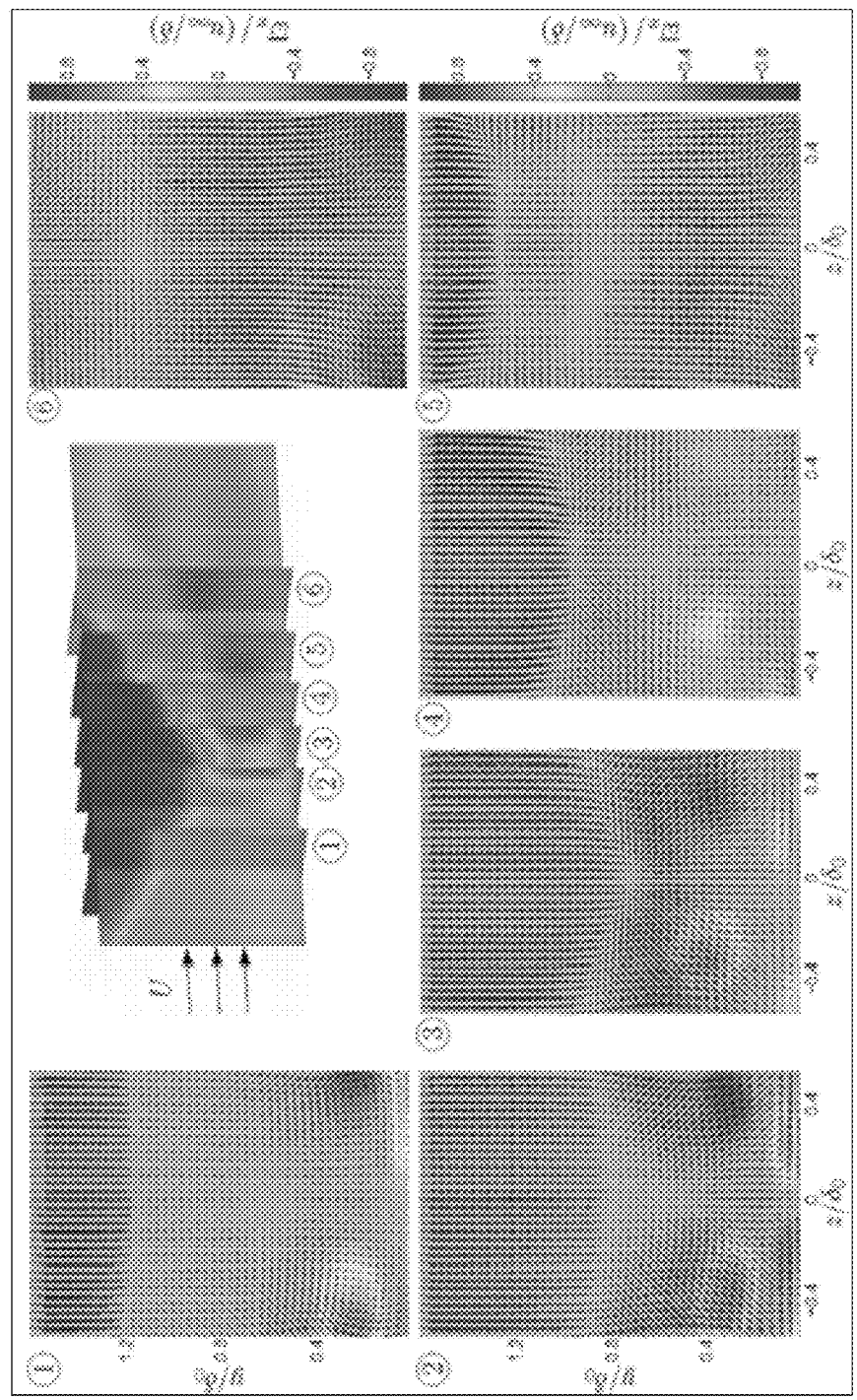

FIG. 9 illustrates color plots of $\bar{\omega}_\chi$ showing the vortex interaction region in transverse planes in this instance for an example application comprising a shock-boundary layer interaction with an incident shock wave that produces a flow deflection angle of $\theta = 10.0$-deg and passive control via inverse micro-ramps located at $\chi/\delta_0 = -9.42$. The averaged in-plane velocity fields $(\bar{v},\bar{w})$ are overlayed as vectors. The six sampling locations correspond to 1: $\chi/\delta_0 = -2.5$, 2: $\chi/\delta_0 = -1.9$, 3: $\chi/\delta_0 = -1.5$, 4: $\chi/\delta_0 = -1.1$, 5: $\chi/\delta_0 = -0.6$ and 6: $\chi/\delta_0 = 0.0$. The central perspective plot shows the relative locations of each plane.

Figure 10:
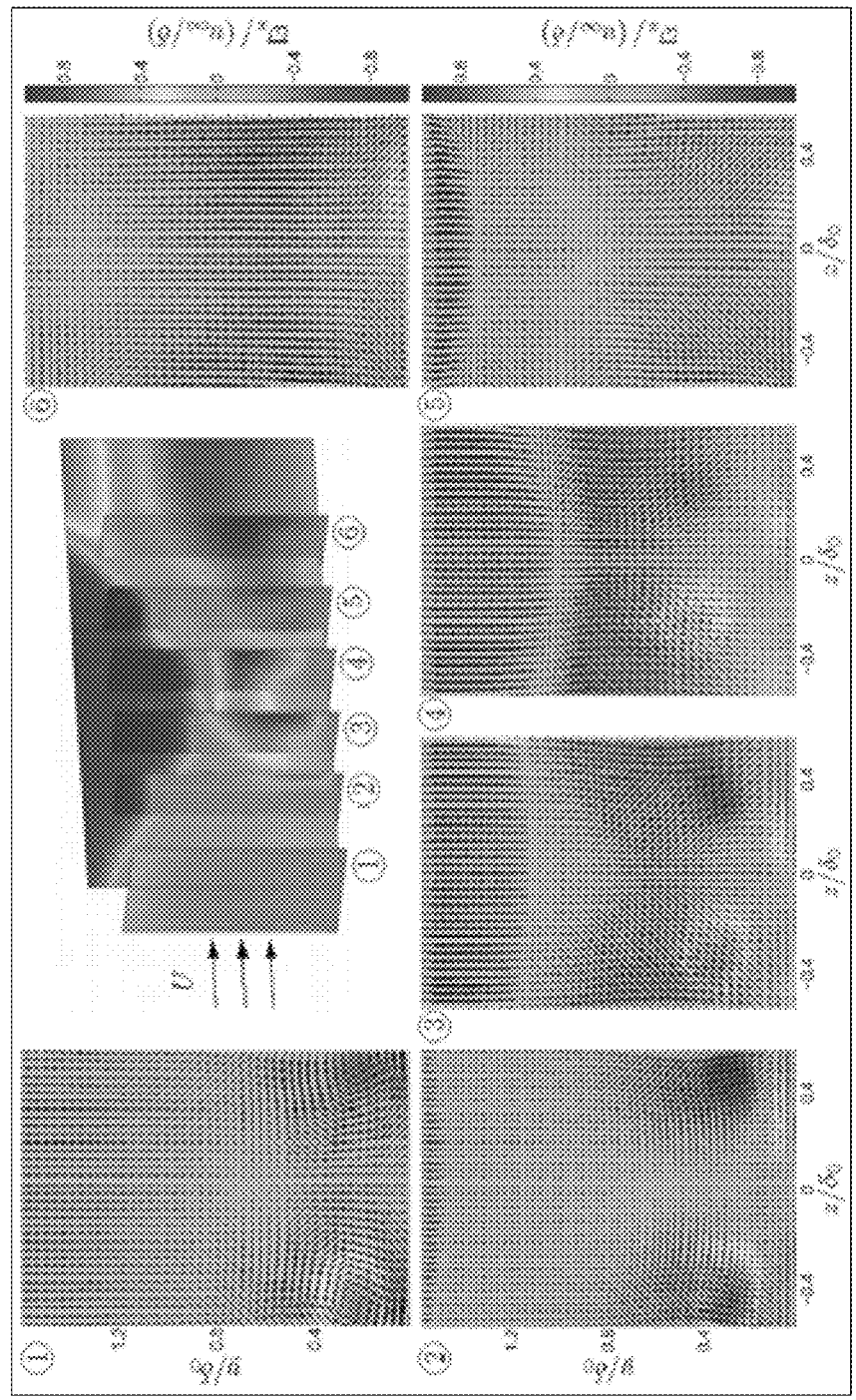

FIG. 10 illustrates color plots of $\bar{\omega}_\chi$ showing the vortex interaction region in transverse planes in this instance for an example application comprising a shock-boundary layer interaction with an incident shock wave that produces a flow deflection angle of $\theta = 12.0$-deg and passive control via inverse micro-ramps located a $\chi/\delta_0 = -9.76$. The averaged in-plane velocity fields $(\bar{v},\bar{w})$ are overlayed as vectors. The six sampling locations correspond to 1: $\chi/\delta_0 = -3.6$, 2: $\chi/\delta_0 = -2.9$, 3: $\chi/\delta_0 = -2.3$, 4: $\chi/\delta_0 = -1.7$, 5: $\chi/\delta_0 = -1.1$, and 6: $\chi/\delta_0 = -0.4$. The central perspective plot shows the relative locations of each plane.

Figure 11:
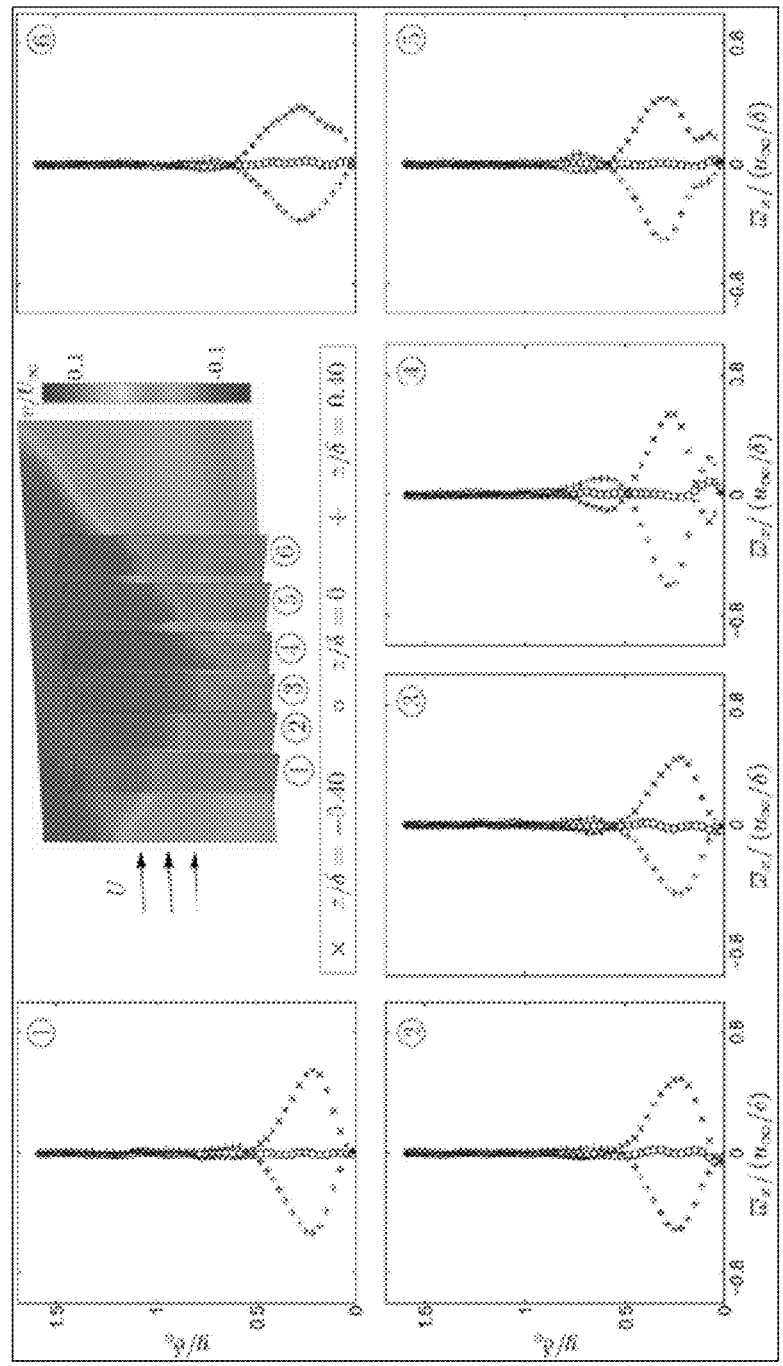

FIG. 11 illustrates the evolution of $\bar{\omega}_\chi$ through the vortex interaction region in this instance for an example application comprising a shock-boundary layer interaction with an incident shock wave that produces a flow deflection angle of $\theta = 7.75$-deg and passive control via inverse micro-ramps located at $\chi/\delta_0 = -8.50$. The six sampling locations correspond to 1: $\chi/\delta_0 = -2.0$, 2: $\chi/\delta_0 = -1.55$, 3: $\chi/\delta_0 = -1.2$, 4: $\chi/\delta_0 = -0.7$, 5: $\chi/\delta_0 = -0.2$, and 6: $\chi/\delta_0 = +0.3$. At top, p, colors show the v field throughout each plan and show the relative location of each plane.

Figure 12:
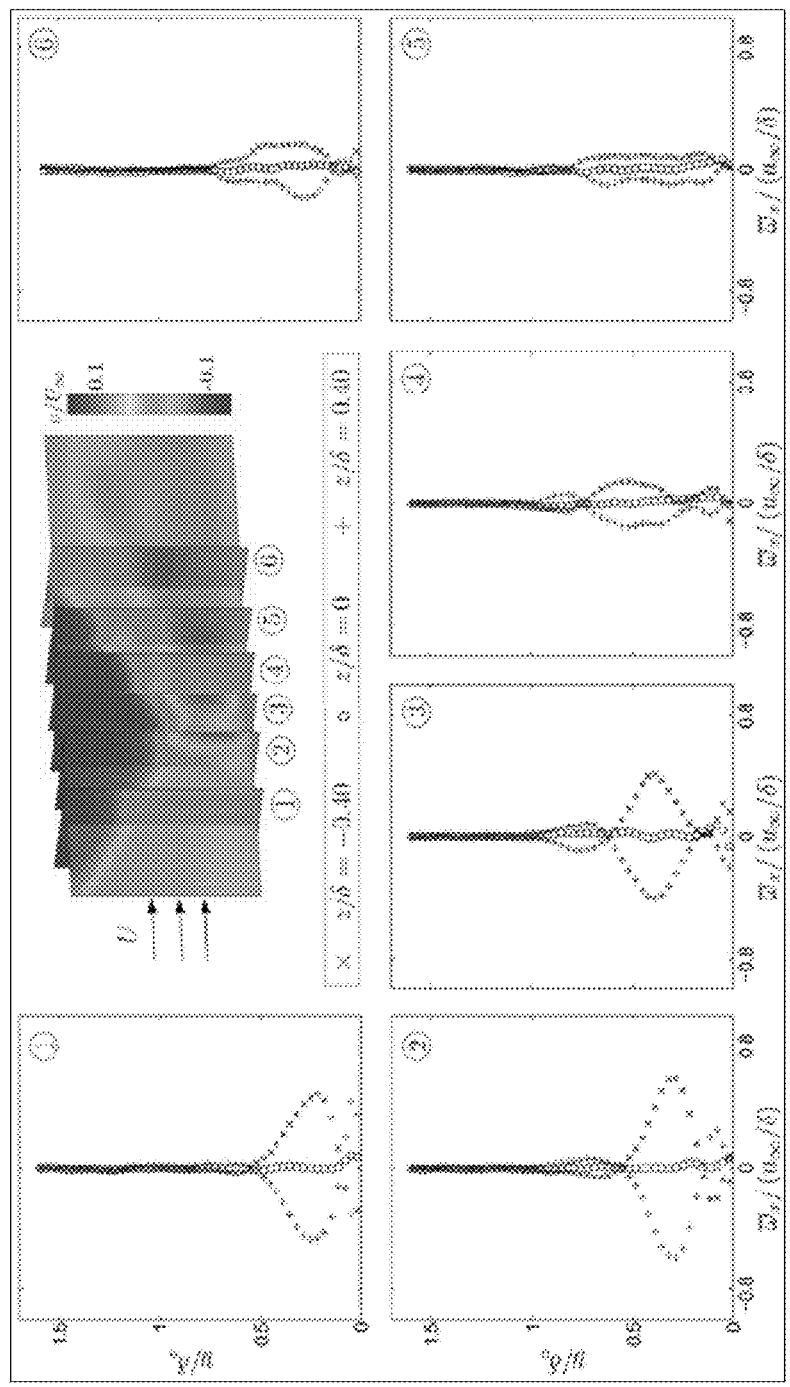

FIG. 12 illustrates the evolution of tux through the vortex interaction region in this instance for an example application comprising a shock-boundary layer interaction with an incident shock wave that produces a flow deflection angle of $\theta = 10.0$-deg and passive control via inverse micro-ramps located at $\chi/\delta_0 = -9.42$. The six sampling locations correspond to 1: $\chi/\delta_0 = -2.5$, 2: $\chi/\delta_0 = -1.9$, 3: $\chi/\delta_0 = -1.5$, 4: $\chi/\delta_0 = -1.1$, 5: $\chi/\delta_0 = -0.6$, and 6: $\chi/\delta_0 = 0.0$. At top, colors show the $\bar{v}$ field throughout each plan and show the relative location of each plane.

Figure 13:
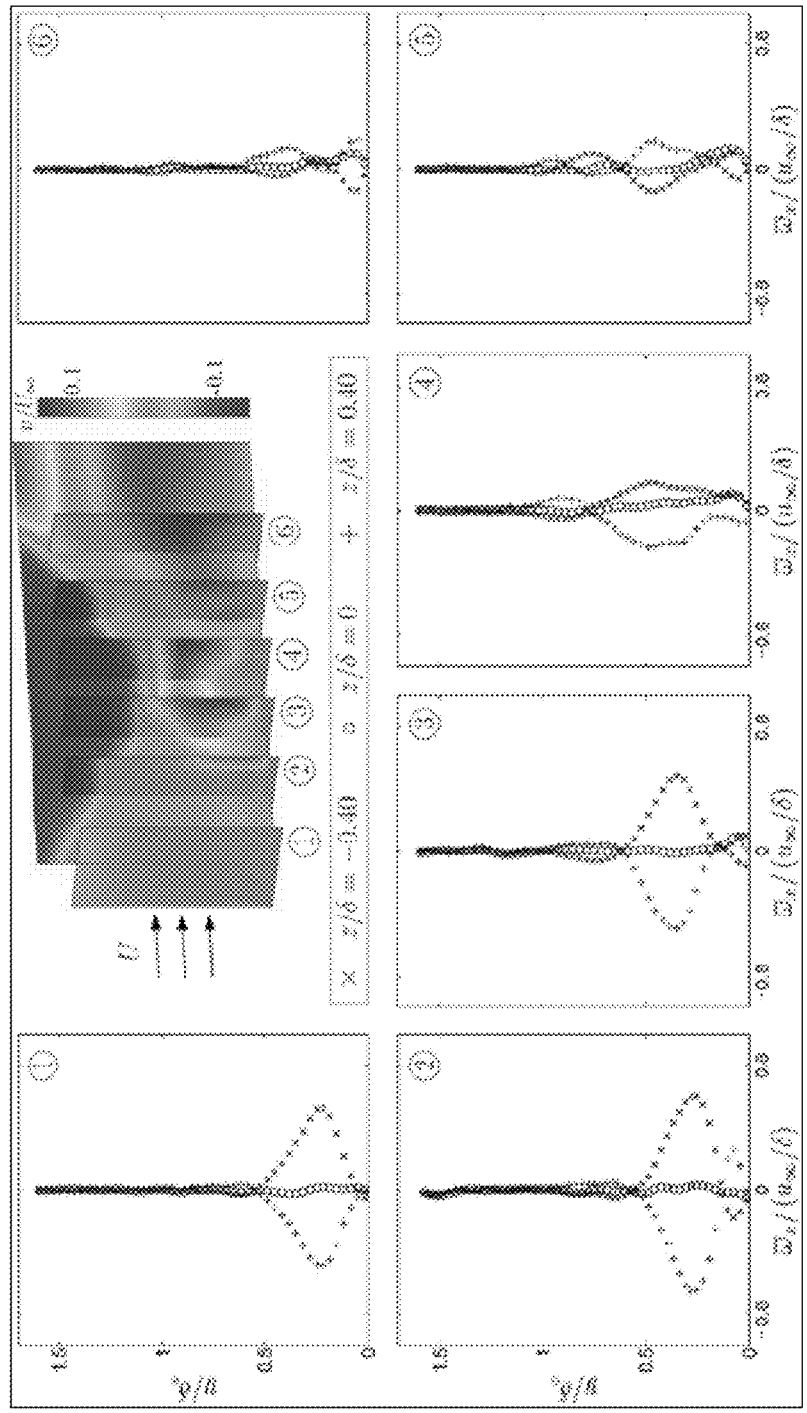

FIG. 13 illustrates the evolution of $\bar{\omega}_\chi$ through the vortex interaction region in this instance for an example application comprising a shock-boundary layer interaction with an incident shock wave that produces a flow deflection angle of $\theta = 12.0$-deg and passive control via inverse micro-ramps located at $\chi/\delta_0 = -9.76$. The six sampling locations correspond to 1: $\chi/\delta_0 = -3.6$, 2: $\chi/\delta_0 = -2.9$, 3: $\chi/\delta_0 = -2.3$, 4: $\chi/\delta_0 = -1.7$, 5: $\chi/\delta_0 = -1.1$, and 6: $\chi/\delta_0 = -0.4$. At top, colors show the $\bar{v}$ field throughout each plan and show the relative location of each plane.

Figure 14:
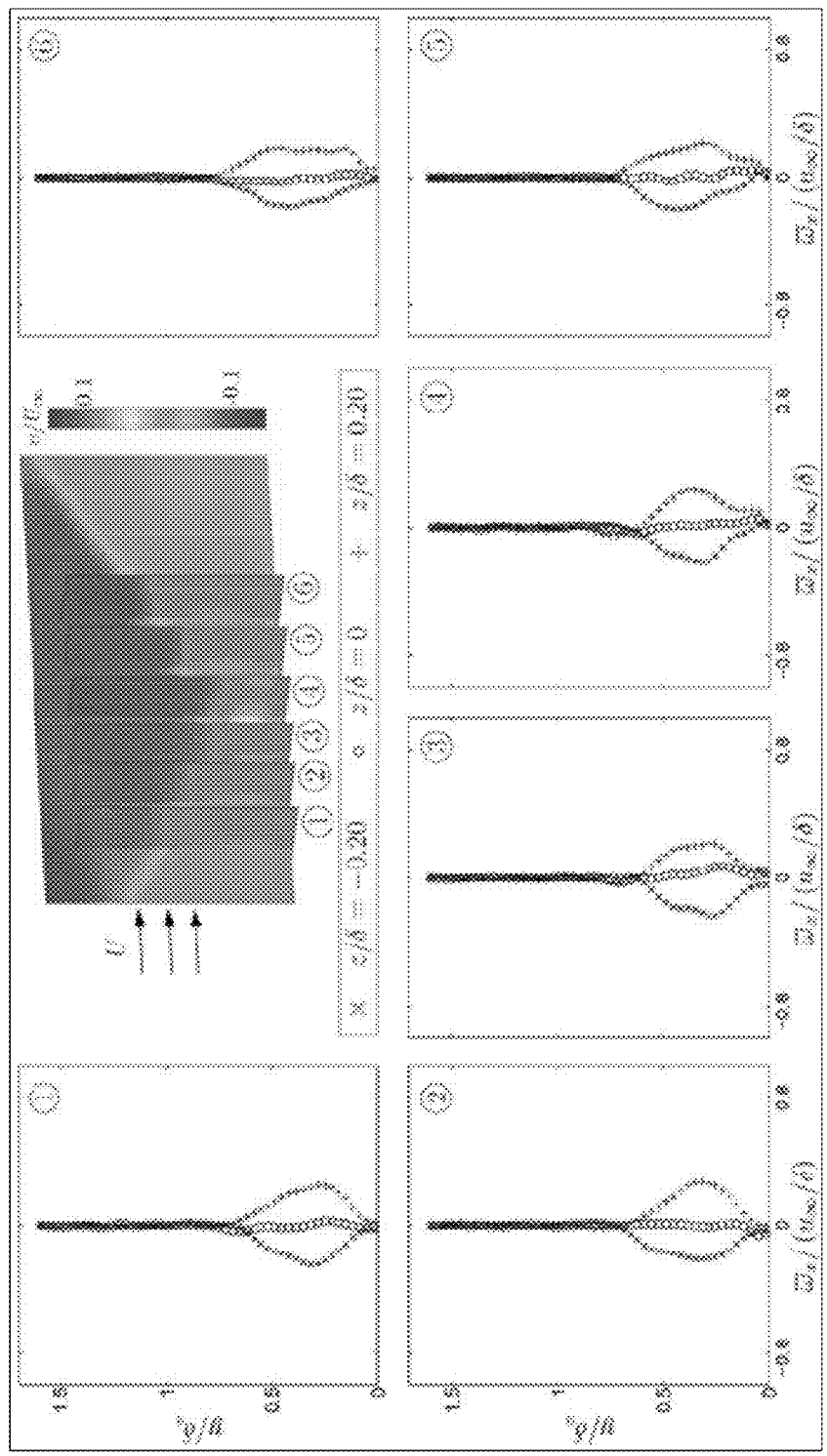

FIG. 14 illustrates the evolution of $\bar{\omega}_\chi$ through the vortex interaction region in this instance for an example application comprising a shock-boundary layer interaction with an incident shock wave that produces a flow deflection angle of $\theta = 7.75$-deg and passive control via standard micro-ramps located at $\chi/\delta_0 = -8.50$. The six sampling locations correspond to 1: $\chi/\delta_0 = -2.0$, 2: $\chi/\delta_0 = -1.55$, 3: $\chi/\delta_0 = -1.2$, 4: $\chi/\delta_0 = -0.7$, 5: $\chi/\delta_0 = -0.2$, and 6: $\chi/\delta_0 = +0.3$. At top, colors show the $\bar{v}$ field throughout each plan and show the relative location of each plane.

Figure 15:
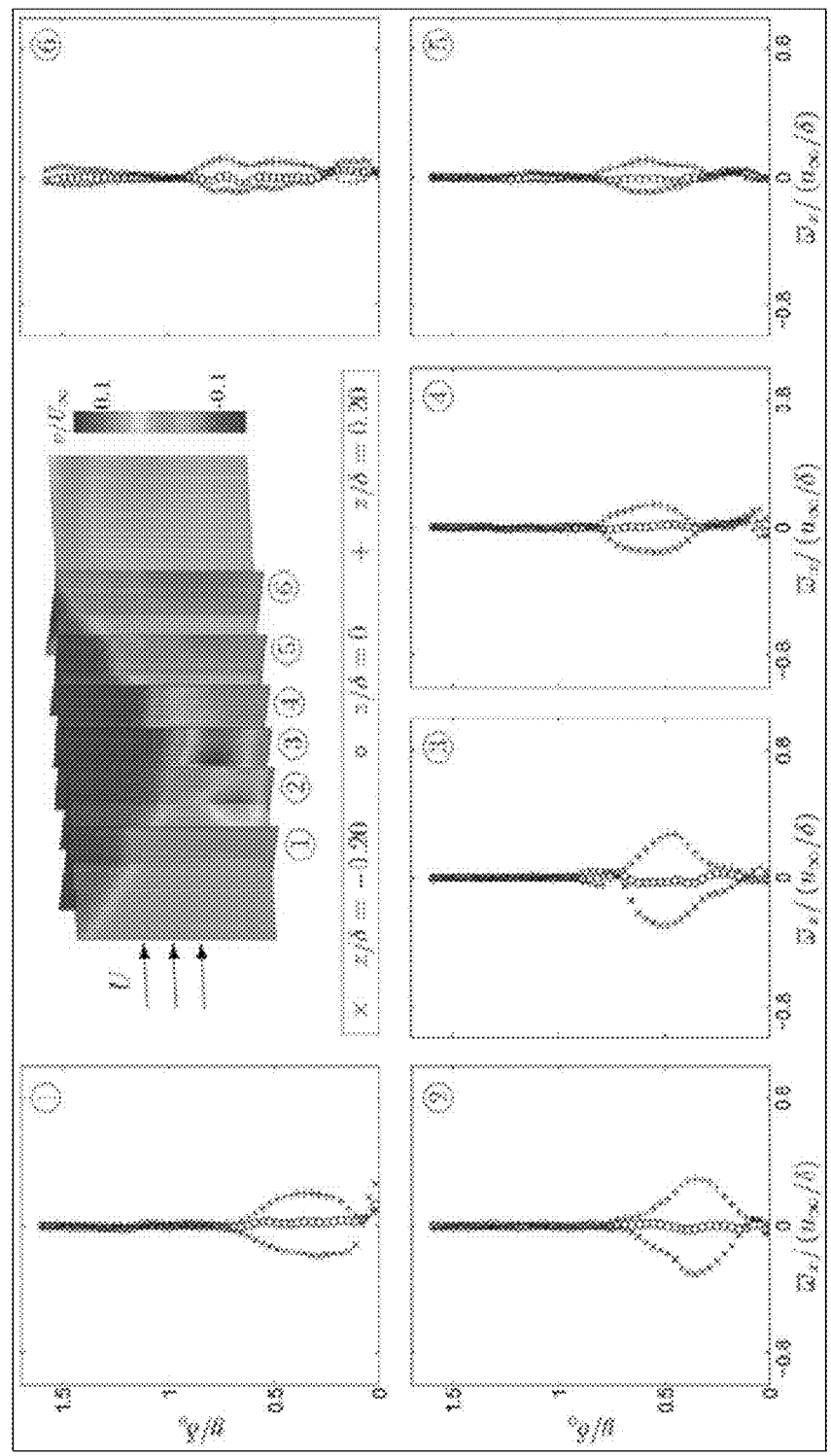

FIG. 15 illustrates the evolution of $\bar{\omega}_\chi$ through the vortex interaction region in this instance for an example application comprising a shock-boundary layer interaction with an incident shock wave that produces a flow deflection angle of $\theta = 10.0$-deg and passive control via standard micro-ramps located at $\chi/\delta_0 = -9.42$. The six sampling locations correspond to 1: $\chi/\delta_0 = -2.5$, 2: $\chi/\delta_0 = -1.9$, 3: $\chi/\delta_0 = -1.5$, 4: $\chi/\delta_0 = -1.1$, 5: $\chi/\delta_0 = -0.6$, and 6: $\chi/\delta_0 = 0.0$. At top, colors show the $\bar{v}$ field throughout each plan and show the relative location of each plane.

Figure 16:
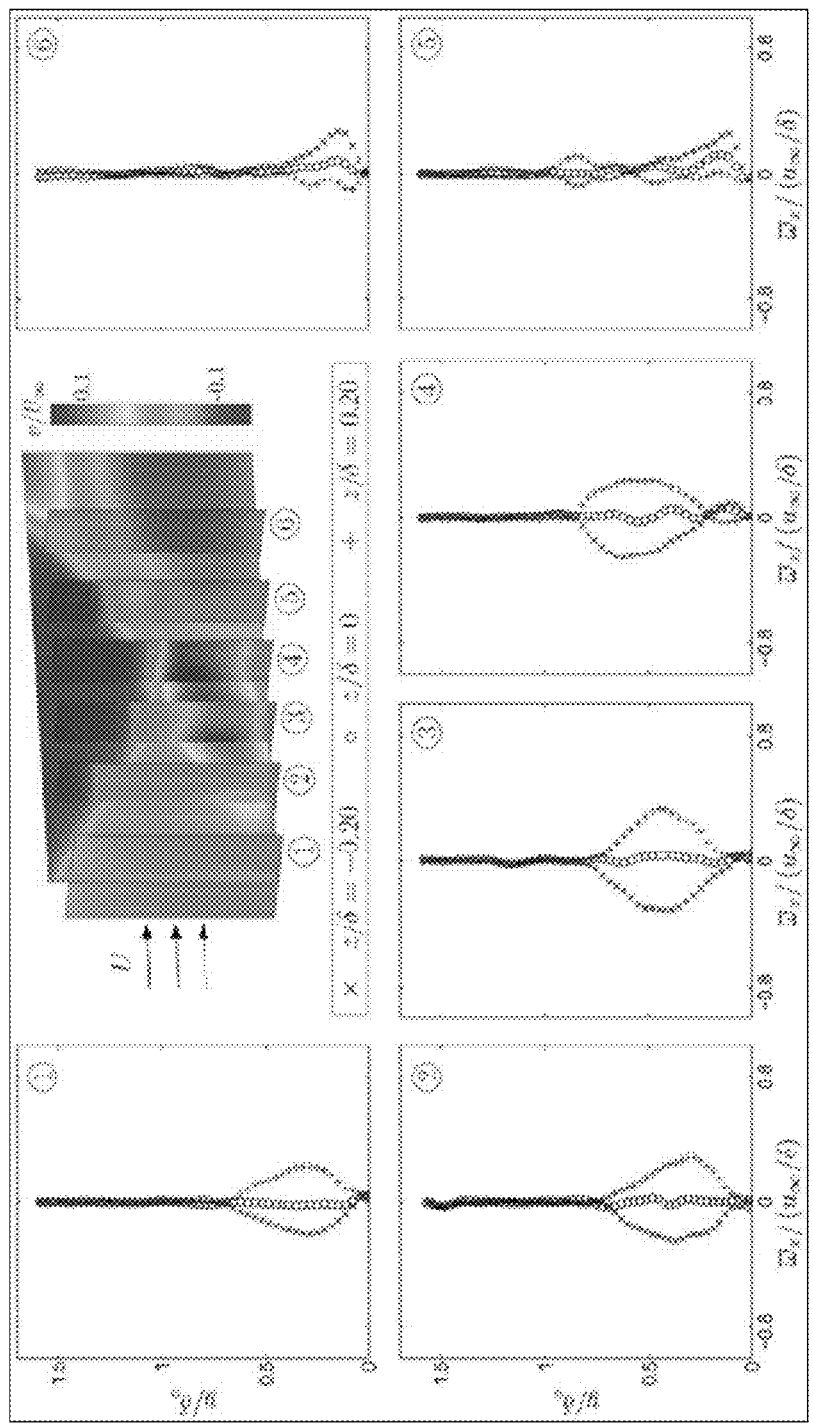

FIG. 16 illustrates the evolution of $\bar{\omega}_\chi$ through the vortex interaction region in this instance for an example application comprising a shock-boundary layer interaction with an incident shock wave that produces a flow deflection angle of $\theta = 12.0$-deg and passive control via standard micro-ramps located at $\chi/\delta_0 = -9.76$. The six sampling locations correspond to 1: $\chi/\delta_0 = -3.6$, 2: $\chi/\delta_0 = -2.9$, 3: $\chi/\delta_0 = -2.3$, 4: $\chi/\delta_0 = -1.7$, 5: $\chi/\delta_0 = -1.1$, and 6: $\chi/\delta_0 = -0.4$. At top, colors show the $\bar{v}$ field throughout each plan and show the relative location of each plane.

Figure 17:
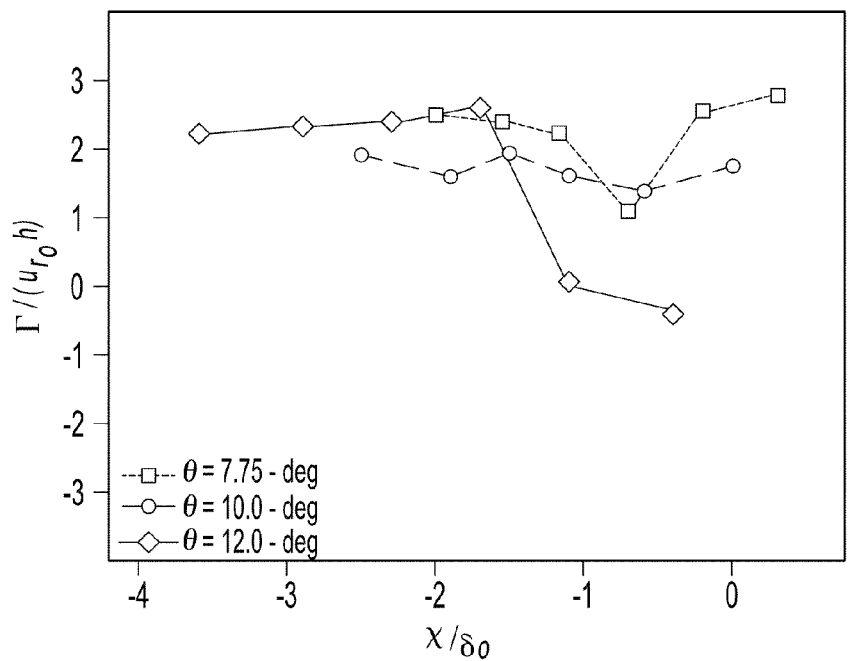

FIG. 17 illustrates evolution of the circulation $\Gamma$ generated by the disclosed inverse micro-ramps shown as a function of downstream distance $\chi/\delta_0$ for all three incident shock strengths.

Figure 18:
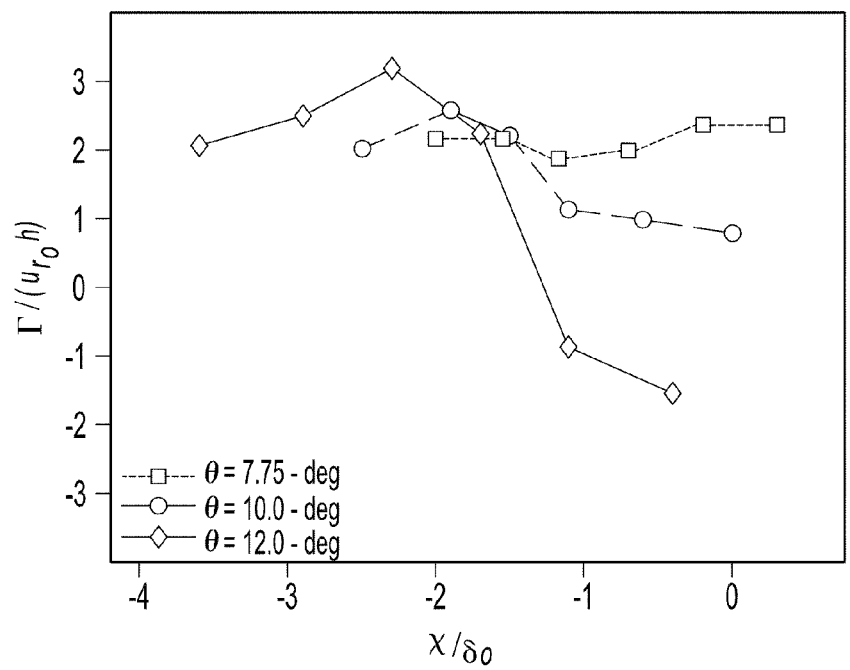

FIG. 18 illustrates evolution of the circulation $\Gamma$ generated by the standard micro-ramps, shown as a function of downstream distance $\chi/\delta_0$ for all three shock strengths.

Figure 19:
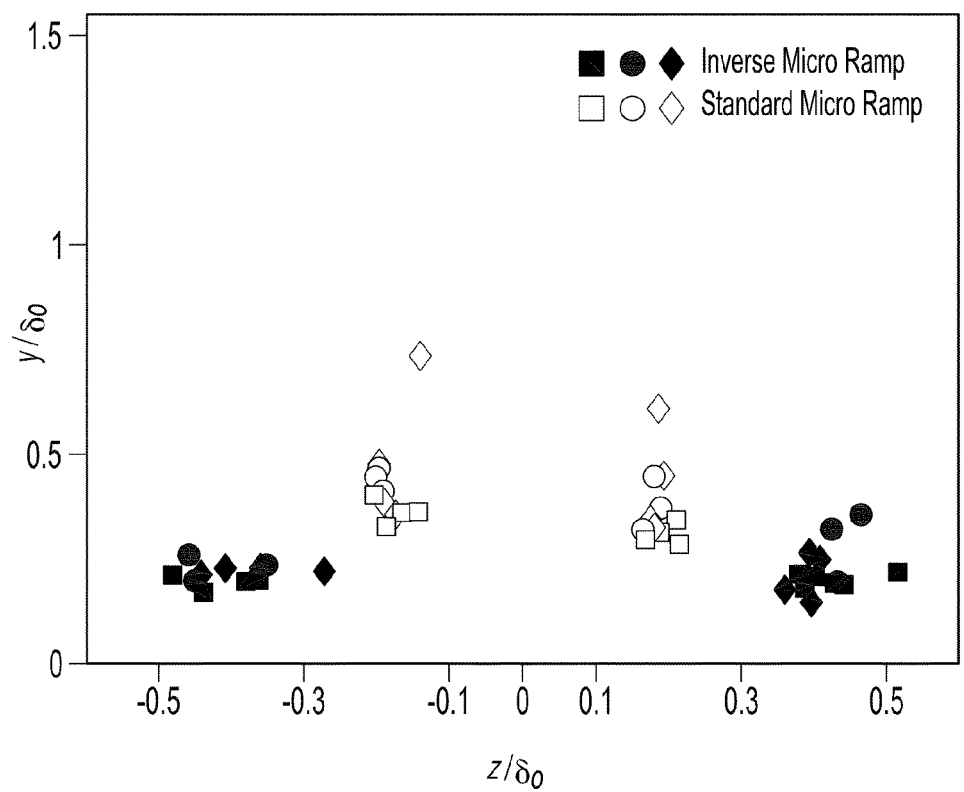

FIG. 19 illustrates the left and right vortex centroids at each x-location and for each shock strength, showing the vertex centroids from the standard micro ramp (open symbols) and inverse micro ramps (filled symbols).

Figure 20:
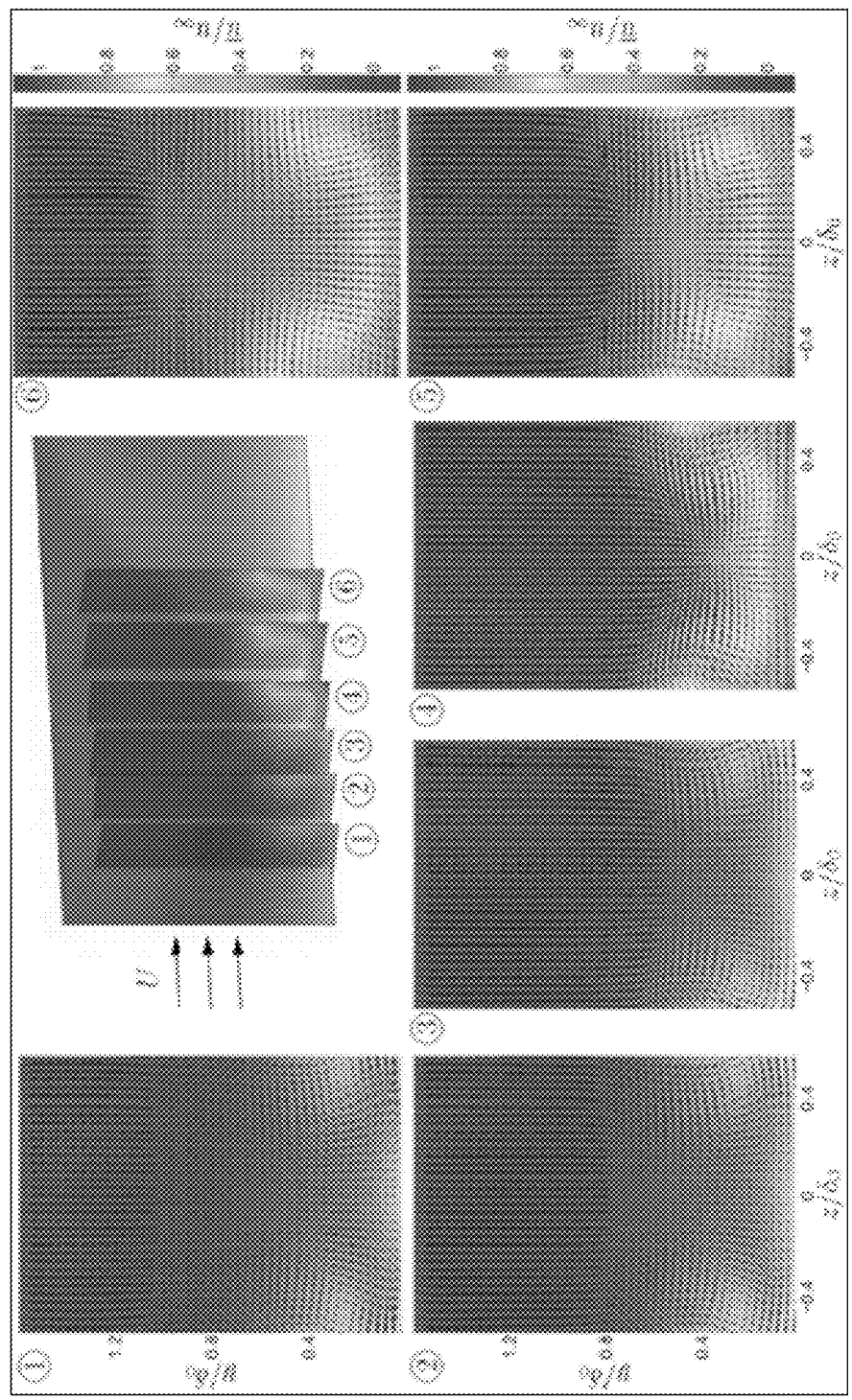

FIG. 20 illustrates color plots of $\bar{u}$ showing the vortex interaction region in transverse planes in this instance for an example application comprising a shock-boundary layer interaction with an incident shock wave that produces a flow deflection angle of $\theta = 7.75$-deg and passive control via inverse micro-ramps located at $\chi/\delta_0 = -8.50$. The averaged in-plane velocity fields $(\bar{v}, \bar{w})$ are overlayed as vectors. The six sampling locations correspond to 1: $\chi/\delta_0 = -2.0$, 2: $\chi/\delta_0 =$ 1.55, 3: $\chi/\delta_0$=−1.2, 4: $\chi/\delta_0$=−0.7, 5: $\chi/\delta_0$=−0.2, and 6: $\chi/\delta_0$=+0.3. The central perspective plot shows the relative locations of each plane.

Figure 21:
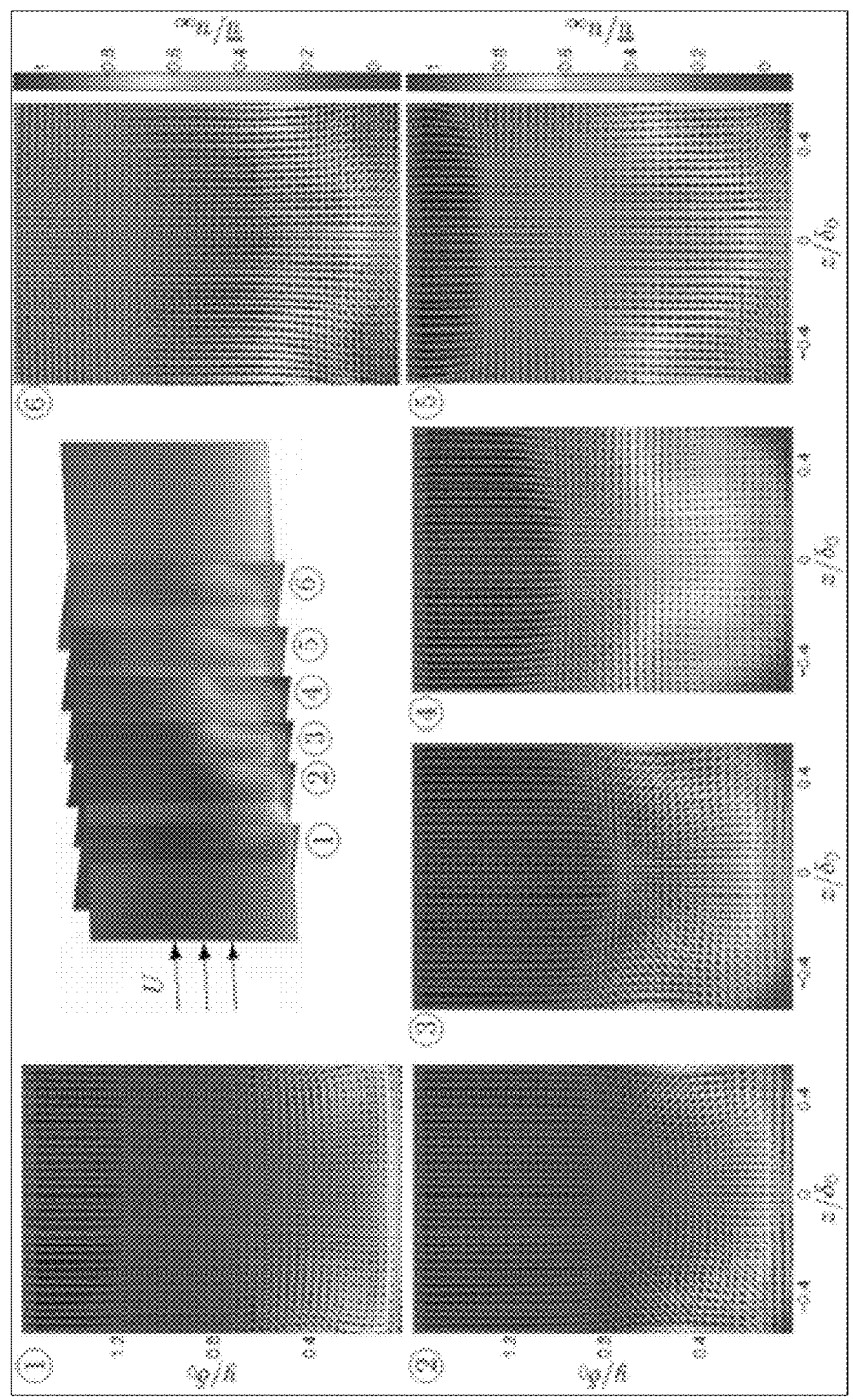

FIG. 21 illustrates color plots of $\bar{u}$ showing the vortex interaction region in transverse planes in this instance for an example application comprising a shock-boundary layer interaction with an incident shock wave that produces a flow deflection angle of $\theta$=10.0−deg and passive control via inverse micro-ramps located at $\chi/\delta_0$=−9.42. The averaged in-plane velocity fields ($\bar{v}$, $\bar{w}$) are overlayed as vectors. The six sampling locations correspond to 1: $\chi/\delta_0$=−2.5, 2: $\chi/\delta_0$=−1.9, 3: $\chi/\delta_0$=−1.5, 4: $\chi/\delta_0$=−1.1, 5: $\chi/\delta_0$=−0.6, and 6: $\chi/\delta_0$=0.0. The central perspective plot shows the relative locations of each plane.

Figure 22:
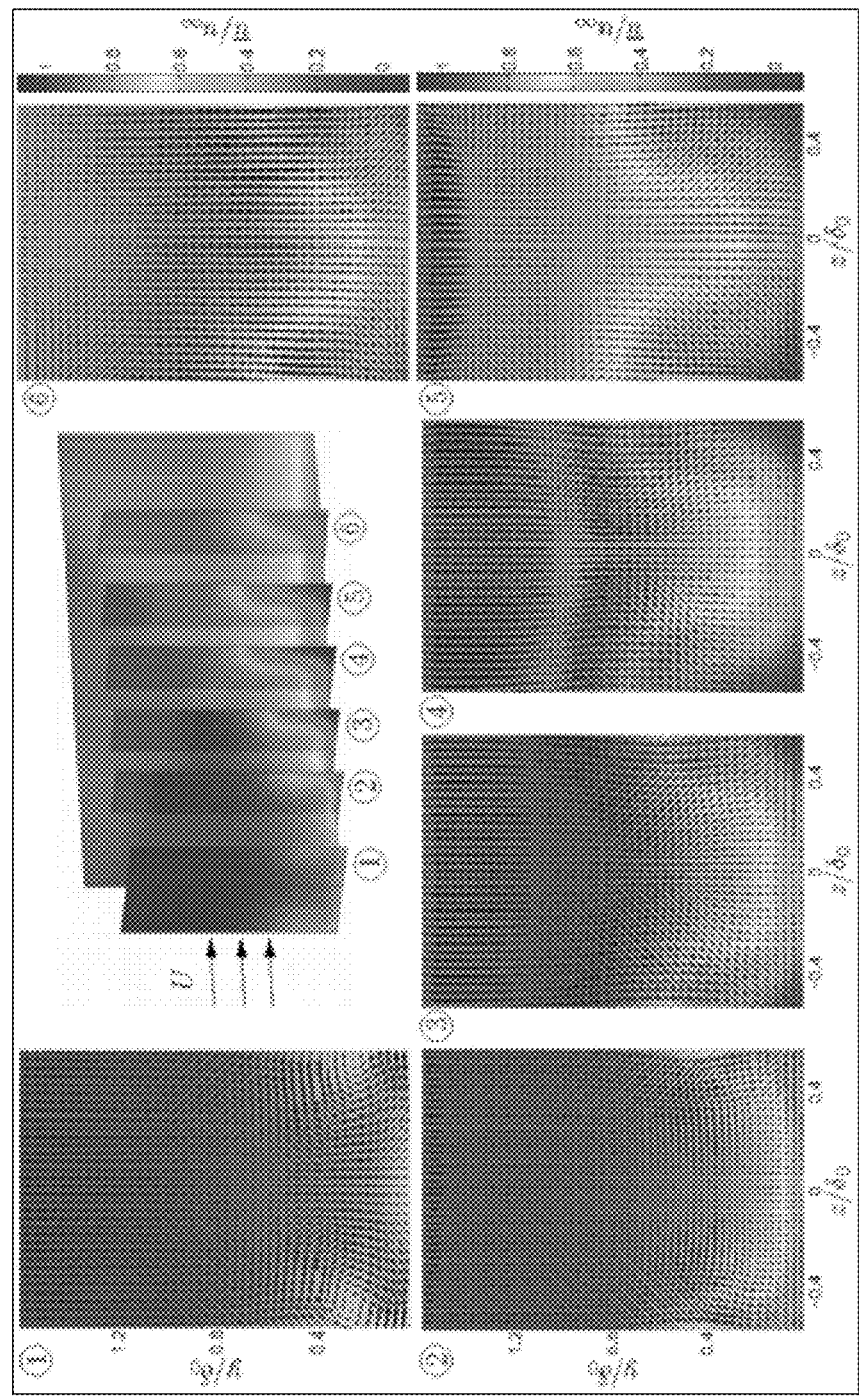

FIG. 22 illustrates color plots of $\bar{u}$ showing the vortex interaction region in transverse planes in this instance for an example application comprising a shock-boundary layer interaction with an incident shock wave that produces a flow deflection angle of $\theta$=12.0−deg and passive control via inverse micro-ramps located at $\chi/\delta_0$=−9.42. The averaged in-plane velocity fields ($\bar{v}$, $\bar{w}$) are overlayed as vectors. The six sampling locations correspond to 1: $\chi/\delta_0$=−3.6, 2: $\chi/\delta_0$=−2.9, 3: $\chi/\delta_0$=−2.3, 4: $\chi/\delta_0$=−1.7, 5: $\chi/\delta_0$=−1.1, and 6: $\chi/\delta_0$=−0.4. The central perspective plot shows the relative locations of each plane.

Figure 23:
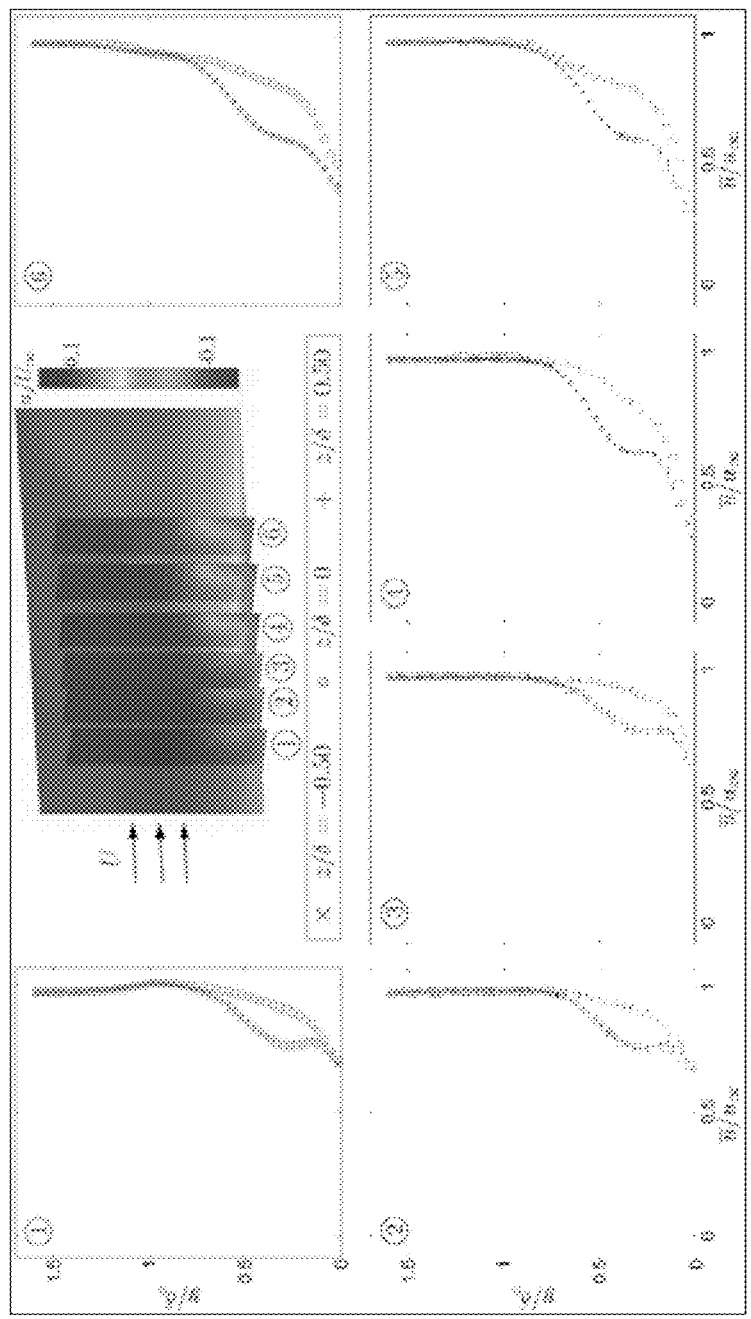

FIG. 23 illustrates the evolution of $\bar{u}$ through the vortex interaction region in this instance for an example application comprising a shock-boundary layer interaction with an incident shock wave that produces a flow deflection angle of $\theta$=7.75−deg and passive control via inverse micro-ramps located at $\chi/\delta_0$=−8.50. The six sampling locations correspond to 1: $\chi/\delta_0$=−2.0, 2: $\chi/\delta_0$=−1.55, 3: $\chi/\delta_0$=−1.2, 4: $\chi/\delta_0$=−0.7, 5: $\chi/\delta_0$=−0.2, and 6: $\chi/\delta_0$=+0.3. At top, colors show the $\bar{u}$ field throughout each plan and show the relative location of each plane.

Figure 24:
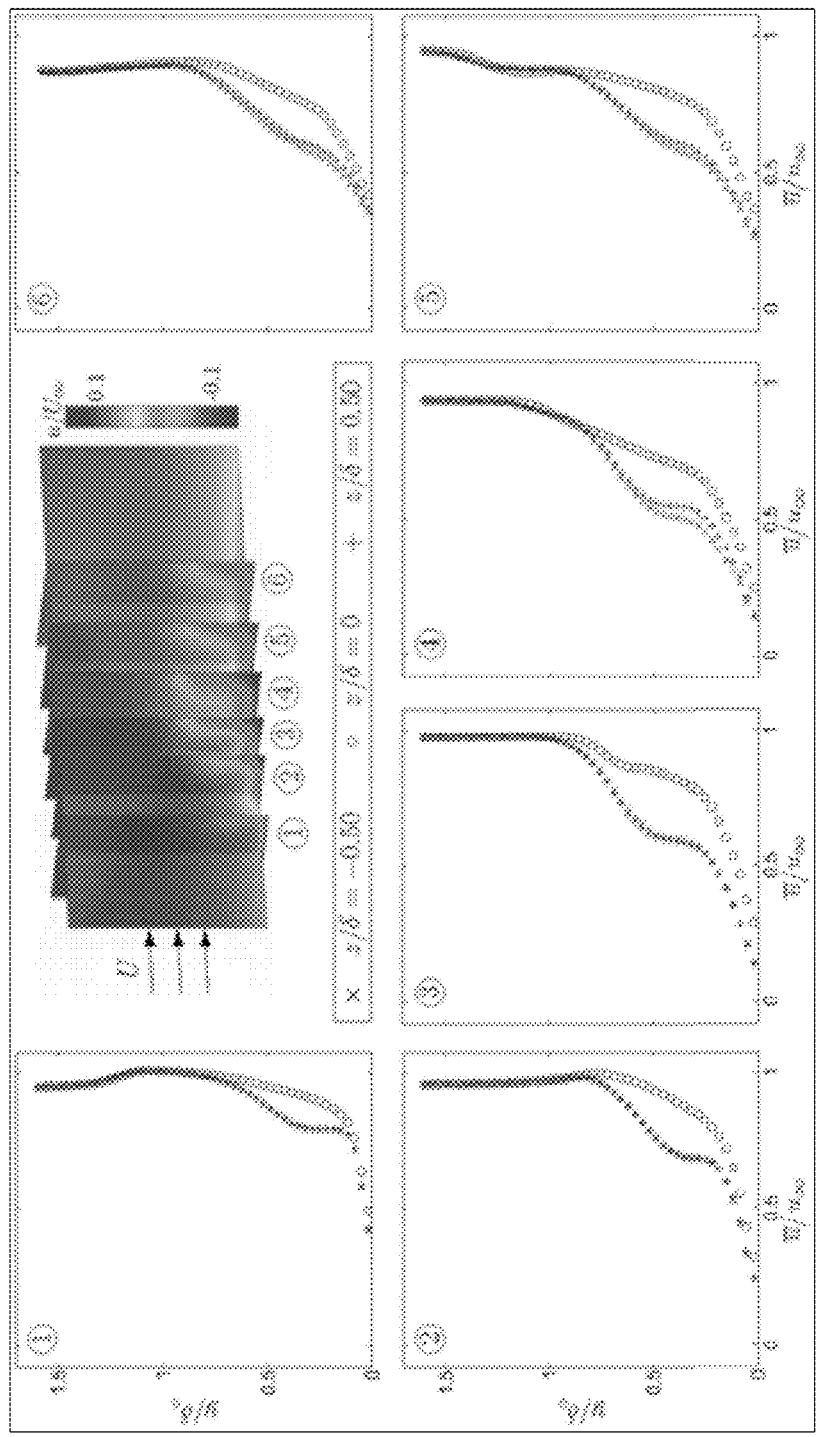

FIG. 24 illustrates the evolution of $\bar{u}$ through the vortex interaction region in this instance for an example application comprising a shock-boundary layer interaction with an incident shock wave that produces a flow deflection angle of $\theta$=10.0−deg and passive control via inverse micro-ramps located at $\chi/\delta_0$=−9.42. The six sampling locations correspond to 1: $\chi/\delta_0$=−2.5, 2: $\chi/\delta_0$=−1.9, 3: $\chi/\delta_0$=−1.5, 4: $\chi/\delta_0$=−1.1, 5: $\chi/\delta_0$=−0.6, and 6: $\chi/\delta_0$=0.0. At top, colors show the $\bar{u}$ field throughout each plan and show the relative location of each plane.

Figure 25:
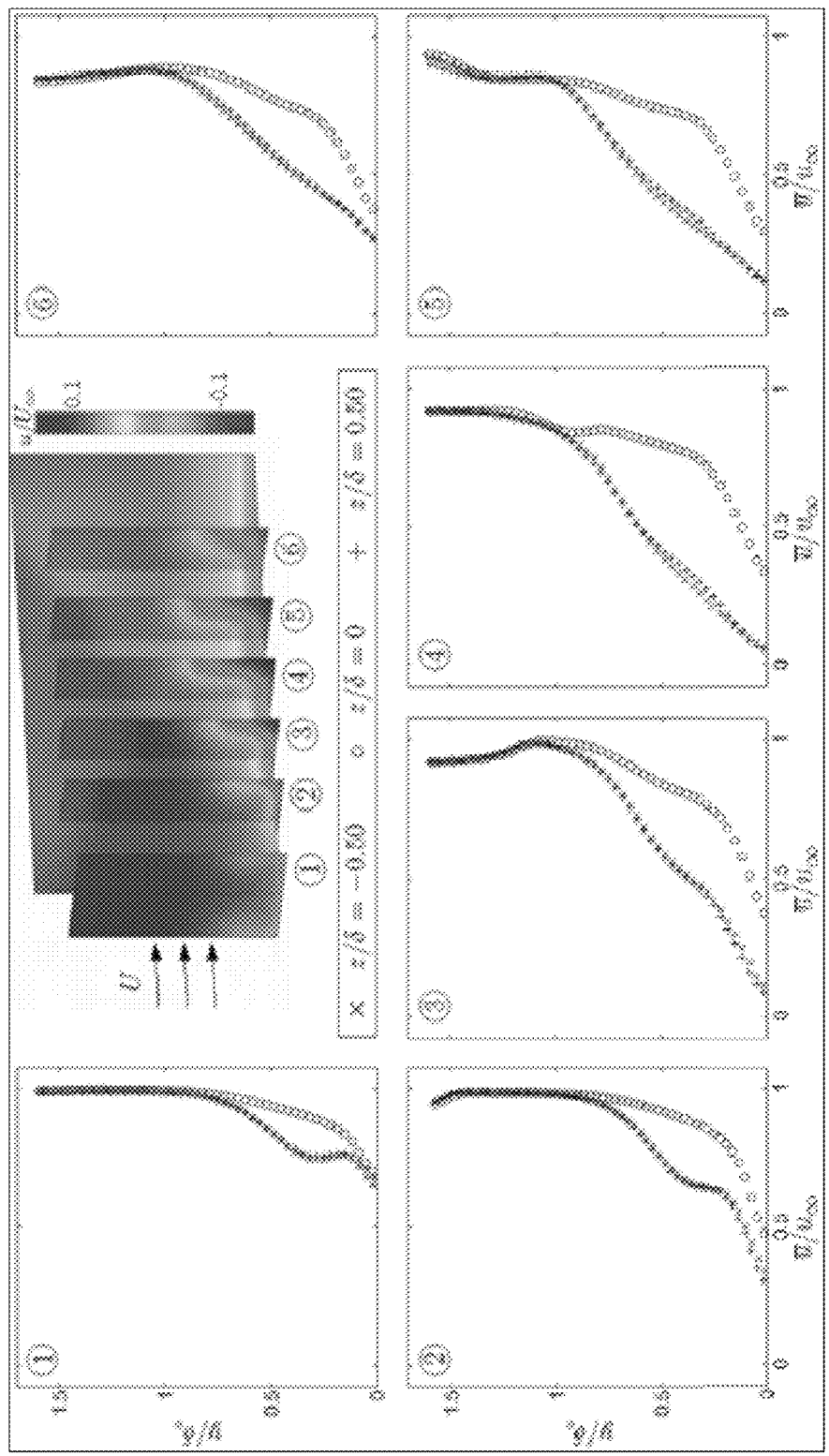

FIG. 25 illustrates the evolution of $\bar{u}$ through the vortex interaction region in this instance for an example application comprising a shock-boundary layer interaction with an incident shock wave that produces a flow deflection angle of $\theta$=12.0−deg and passive control via inverse micro-ramps located at $\chi/\delta_0$=−9.76. The six sampling locations correspond to 1: $\chi/\delta_0$=−3.6, 2: $\chi/\delta_0$=−2.9, 3: $\chi/\delta_0$=−2.3, 4: $\chi/\delta_0$=−1.7, 5: $\chi/\delta_0$=−1.1, and 6: $\chi/\delta_0$=−0.4. At top, colors show the $\bar{u}$ field throughout each plan and show the relative location of each plane.

Figure 26:
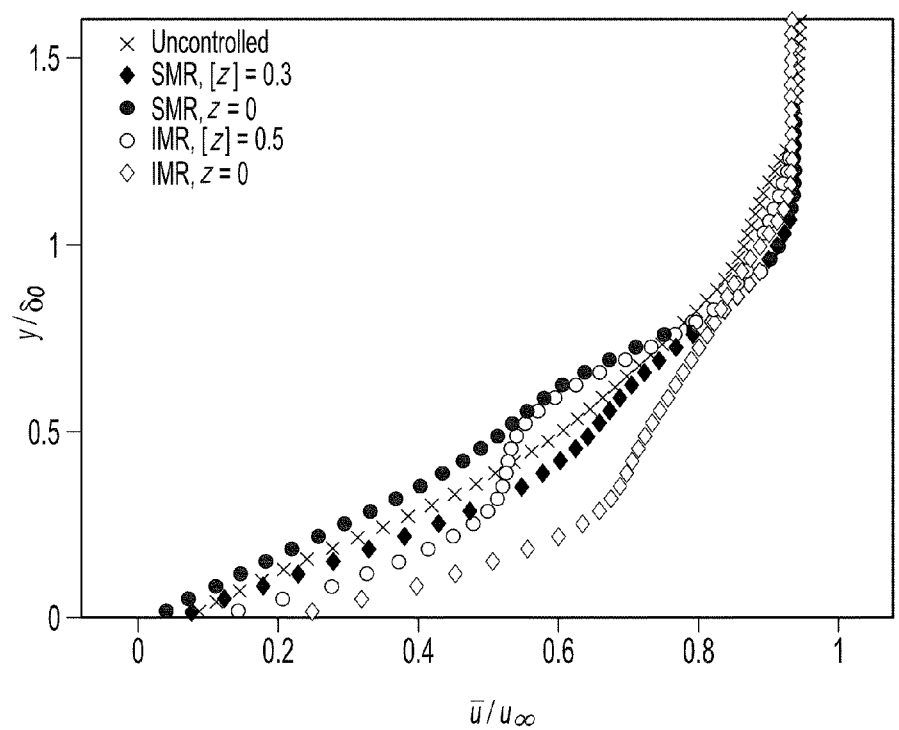

FIG. 26 illustrates a comparison of the controlled boundary layers using the standard micro ramp (SMR) and inverse micro ramp (IMR) to uncontrolled boundary layer at the $\chi/\delta_0$=−1.1 location of the $\theta$=10.0−deg interaction. Circles denote vortex-induced upwash regions, and diamonds represent vortex-induced downwash regions.

Figure 27:
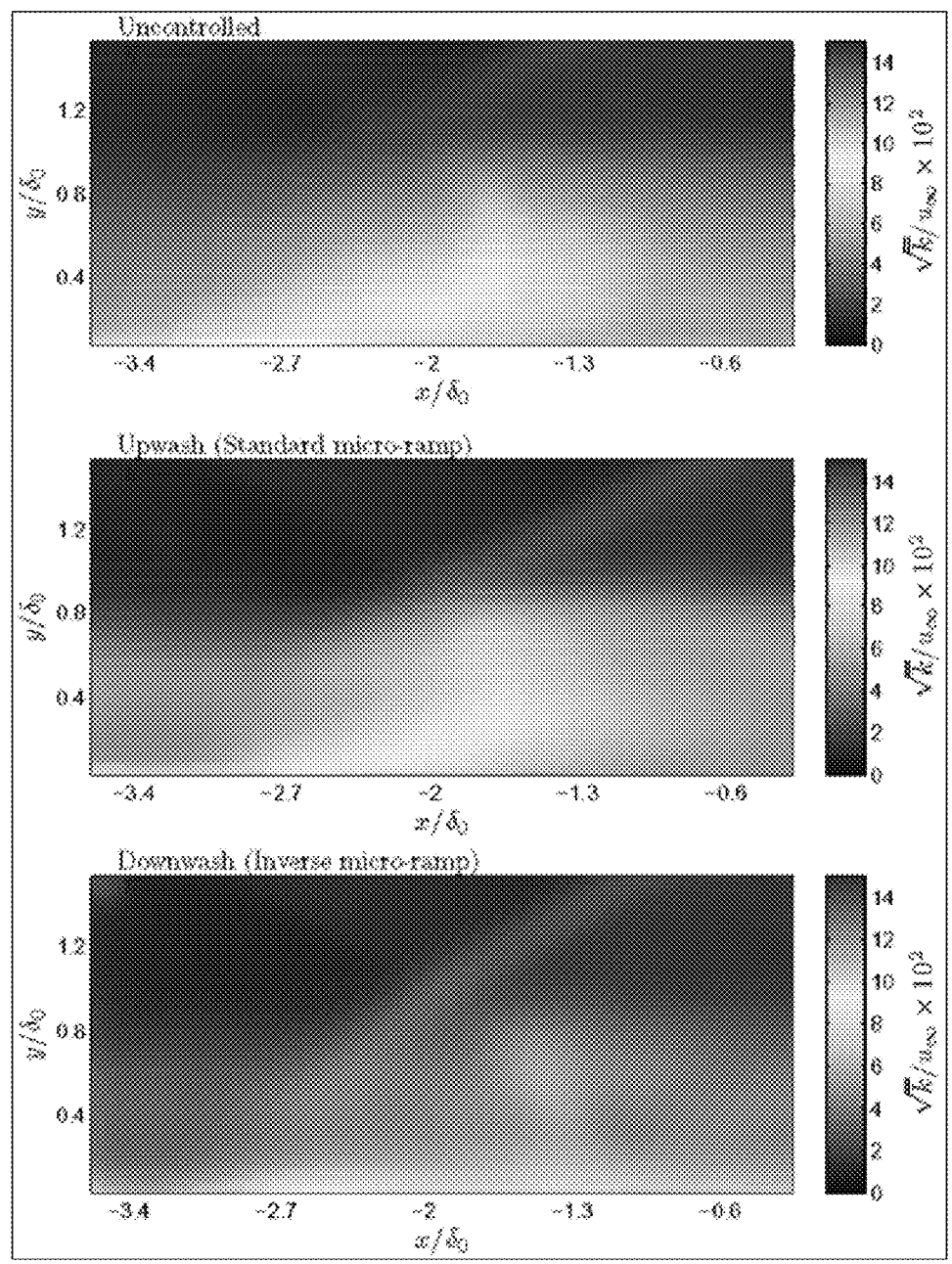

FIG. 27 illustrates the mean turbulence kinetic energy $\bar{k}$ fields along the tunnel centerline from the uncontrolled interaction, the vortex-induced upwash region produced by the standard micro-ramp, and the vortex-induced downwash region produced by the inverse micro-ramp. All visualizations involve the $\theta$=12.0−deg flow deflection angle.

Figure 28:
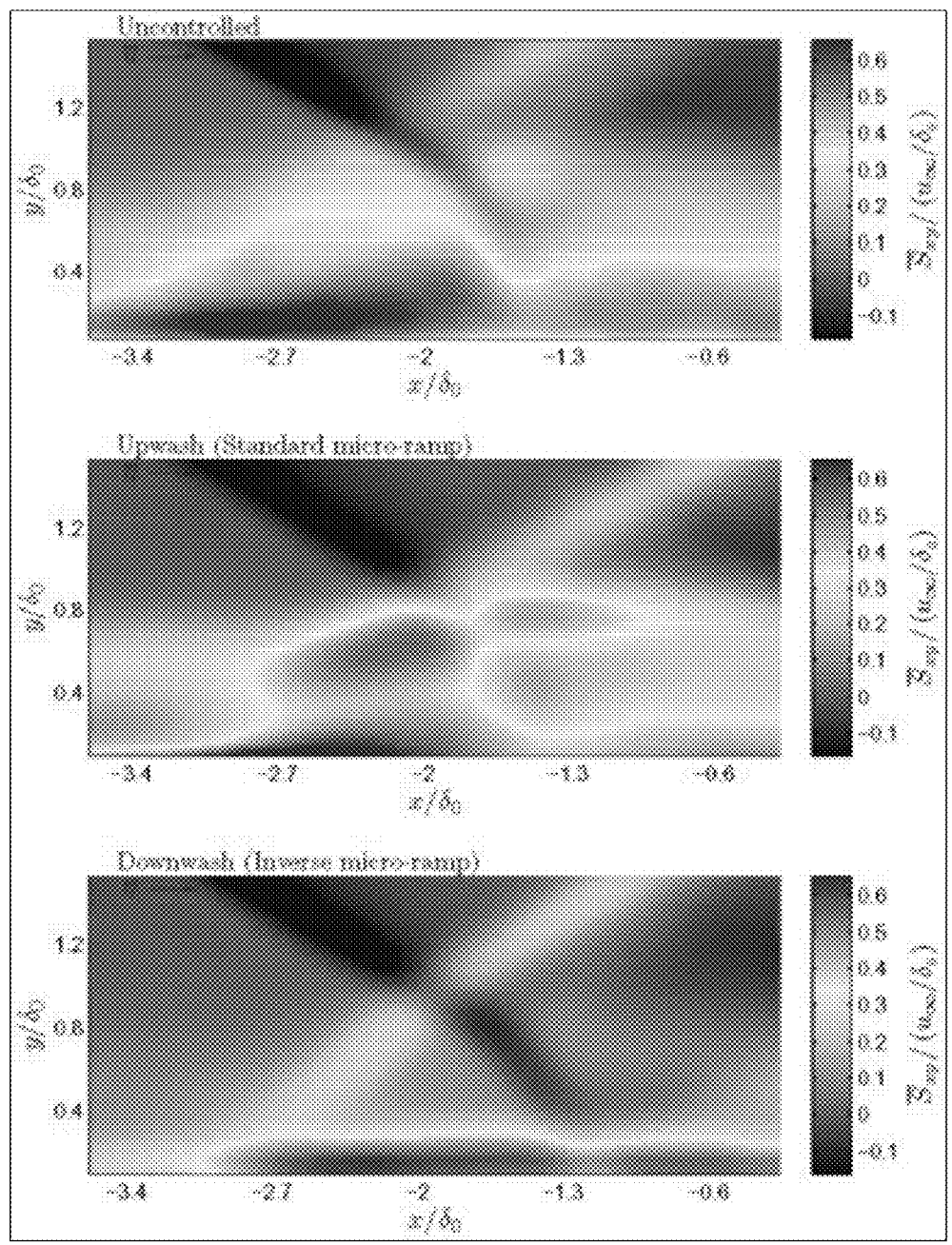

FIG. 28 illustrates the mean shear strain rate $\bar{S}_{xy}$ fields along the tunnel centerline from the uncontrolled interaction, the vortex-induced upwash region produced by the standard micro-ramp, and the vortex-induced downwash region produced by the inverse micro-ramp. All visualizations involve the $\theta$=12.0−deg flow deflection angle.

Figure 29:
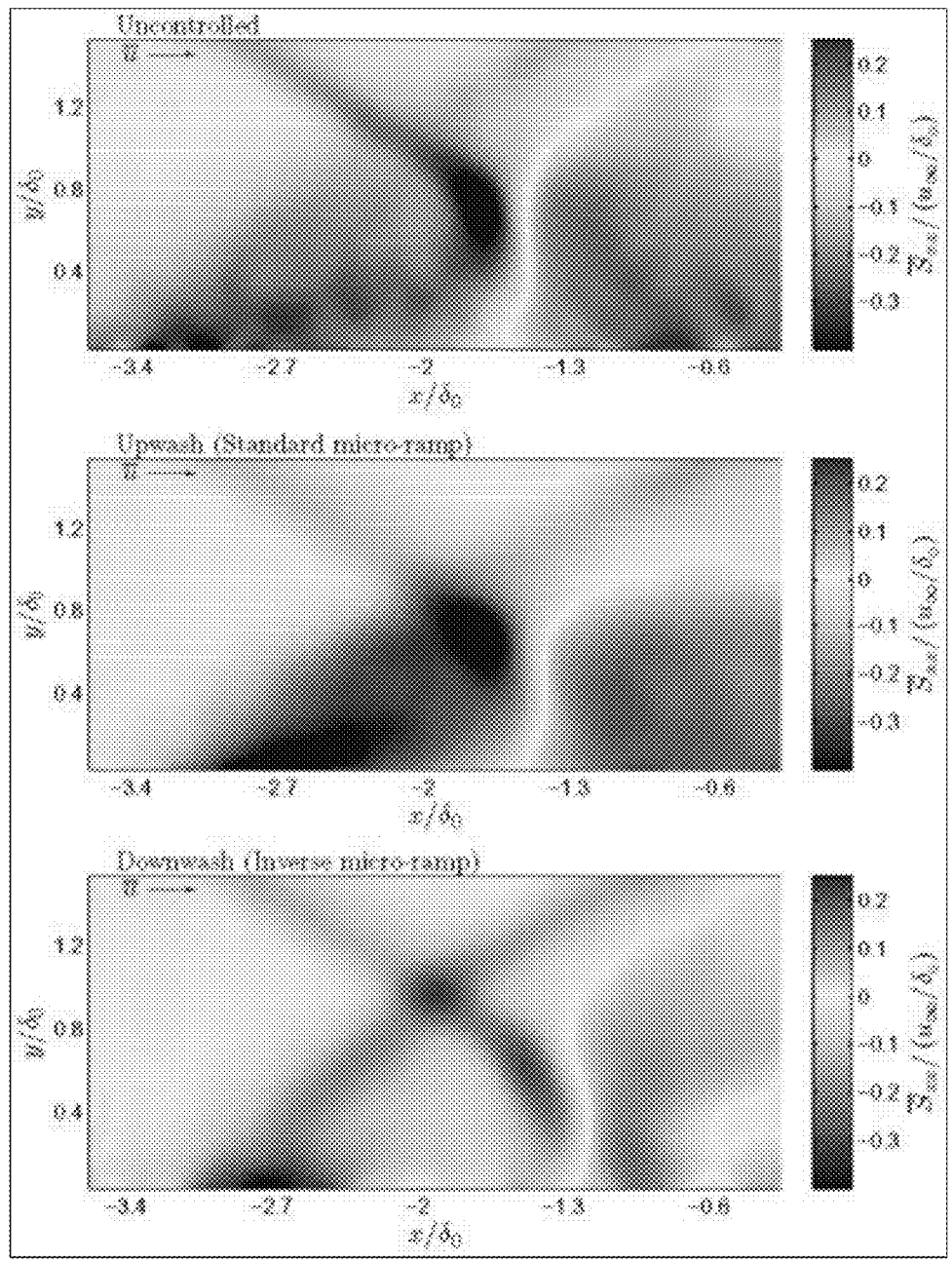

FIG. 29 illustrates the mean normal strain rate $\bar{S}_{xy}$ fields along the tunnel centerline from the uncontrolled interaction, the vortex-induced upwash region produced by the standard micro-ramp, and the vortex-induced downwash region produced by the inverse micro-ramp. All visualizations involve the $\theta$=12.0−deg flow deflection angle.

Figure 30:
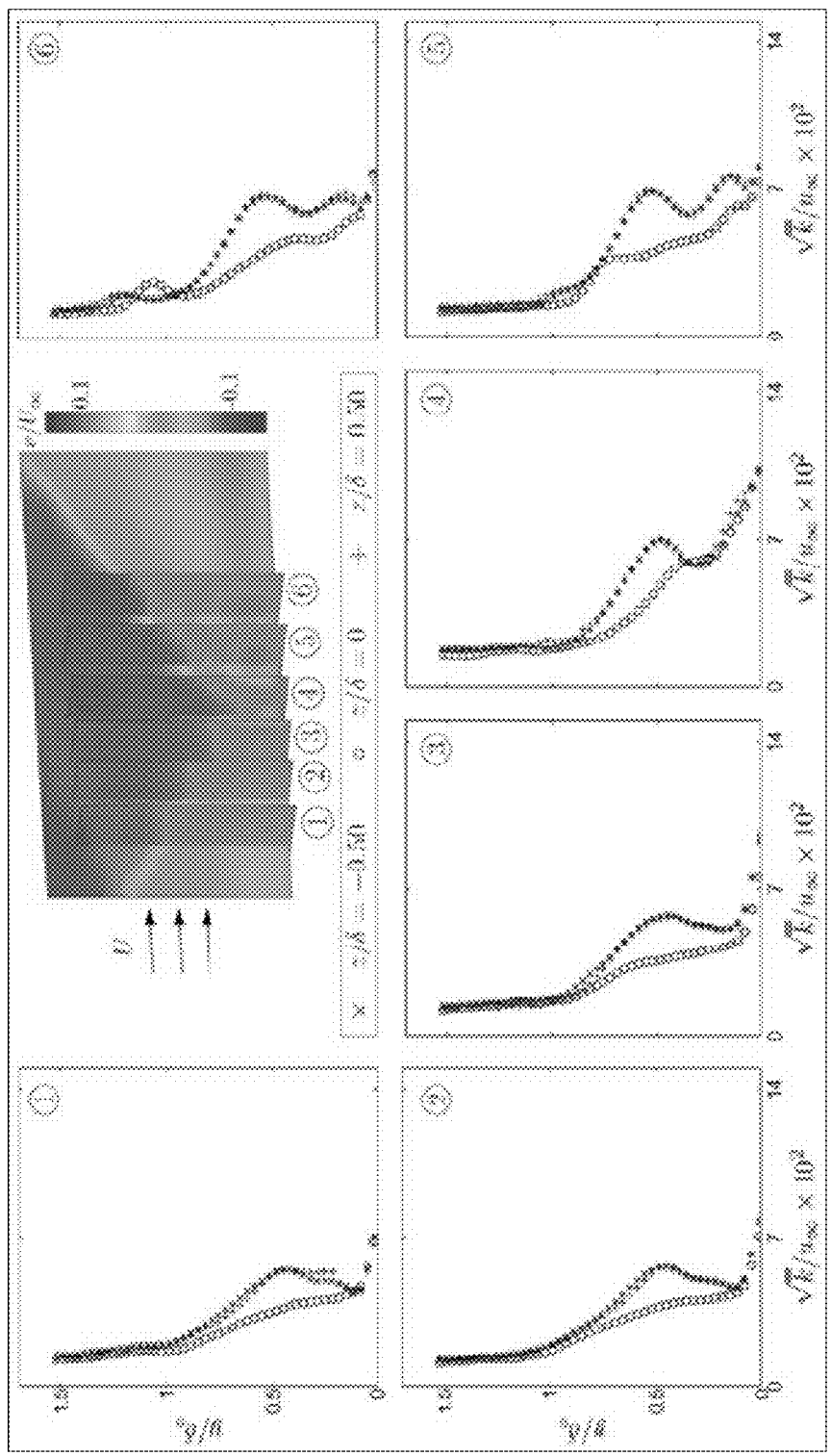

FIG. 30 illustrates the evolution of $\bar{k}$ through the vortex interaction region in this instance for an example application comprising a shock-boundary layer interaction with an incident shock wave that produces a flow deflection angle of $\theta$=7.75−deg and passive control via inverse micro-ramps located at $\chi/\delta_0$=−8.50. The six sampling locations correspond to 1: $\chi/\delta_0$=−2.0, 2: $\chi/\delta_0$=−1.55, 3: $\chi/\delta_0$=−1.2, 4: $\chi/\delta_0$=−0.7, 5: $\chi/\delta_0$=−0.2, and 6: $\chi/\delta_0$=+0.3. At top, colors show the $\bar{v}$ field throughout each plan and show the relative location of each plane.

Figure 31:
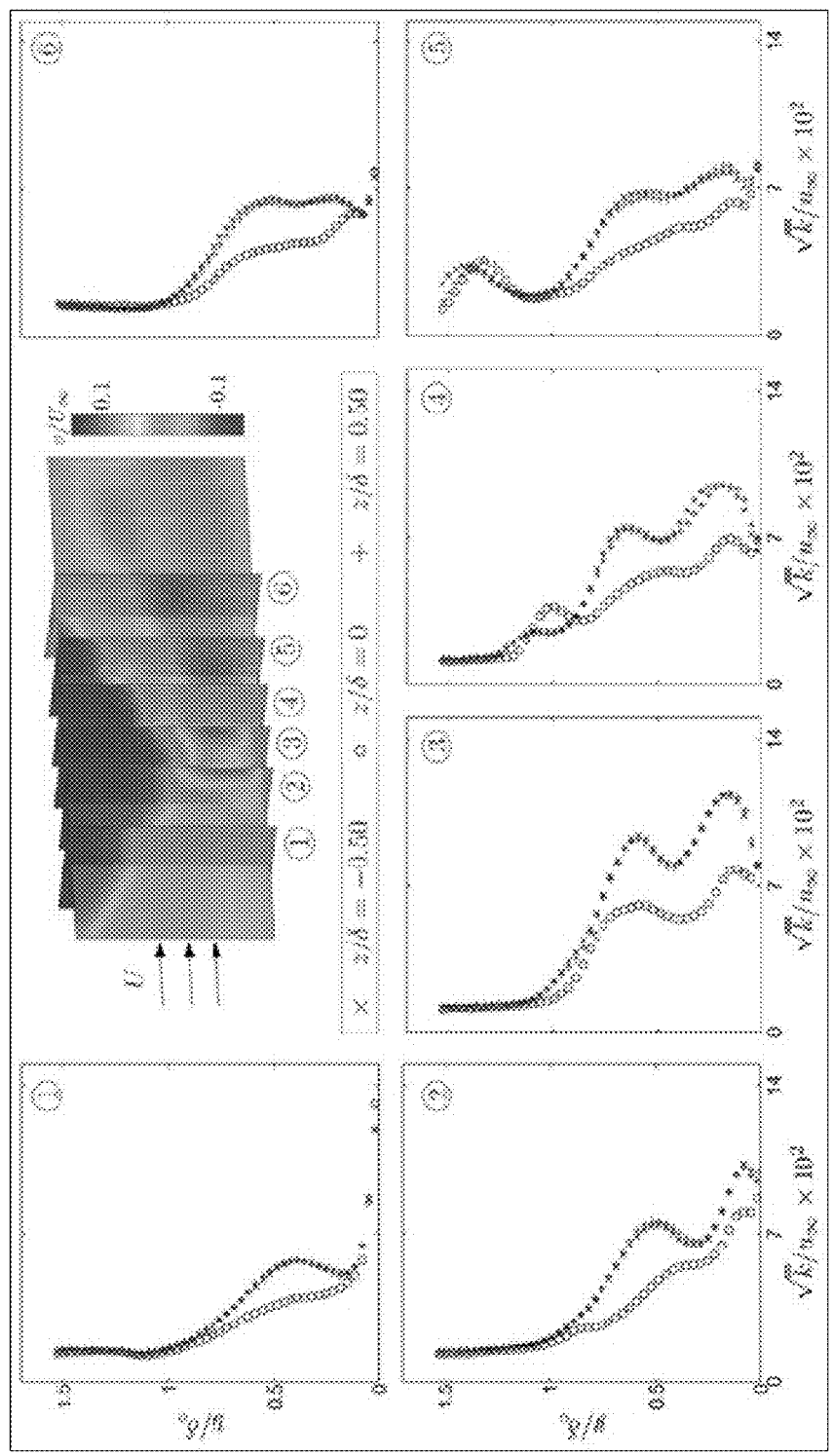

FIG. 31 illustrates the evolution of $\bar{k}$ through the vortex interaction region in this instance for an example application comprising a shock-boundary layer interaction with an incident shock wave that produces a flow deflection angle of $\theta$=10.0−deg and passive control via inverse micro-ramps located at $\chi/\delta_0$=−9.42. The six sampling locations correspond to 1: $\chi/\delta_0$=−2.5, 2: $\chi/\delta_0$=−1.9, 3: $\chi/\delta_0$=−1.5, 4: $\chi/\delta_0$=−1.1, 5: $\chi/\delta_0$=−0.6, and 6: $\chi/\delta_0$=0.0. At top, colors show the $\bar{v}$ field throughout each plan and show the relative location of each plane.

Figure 32:
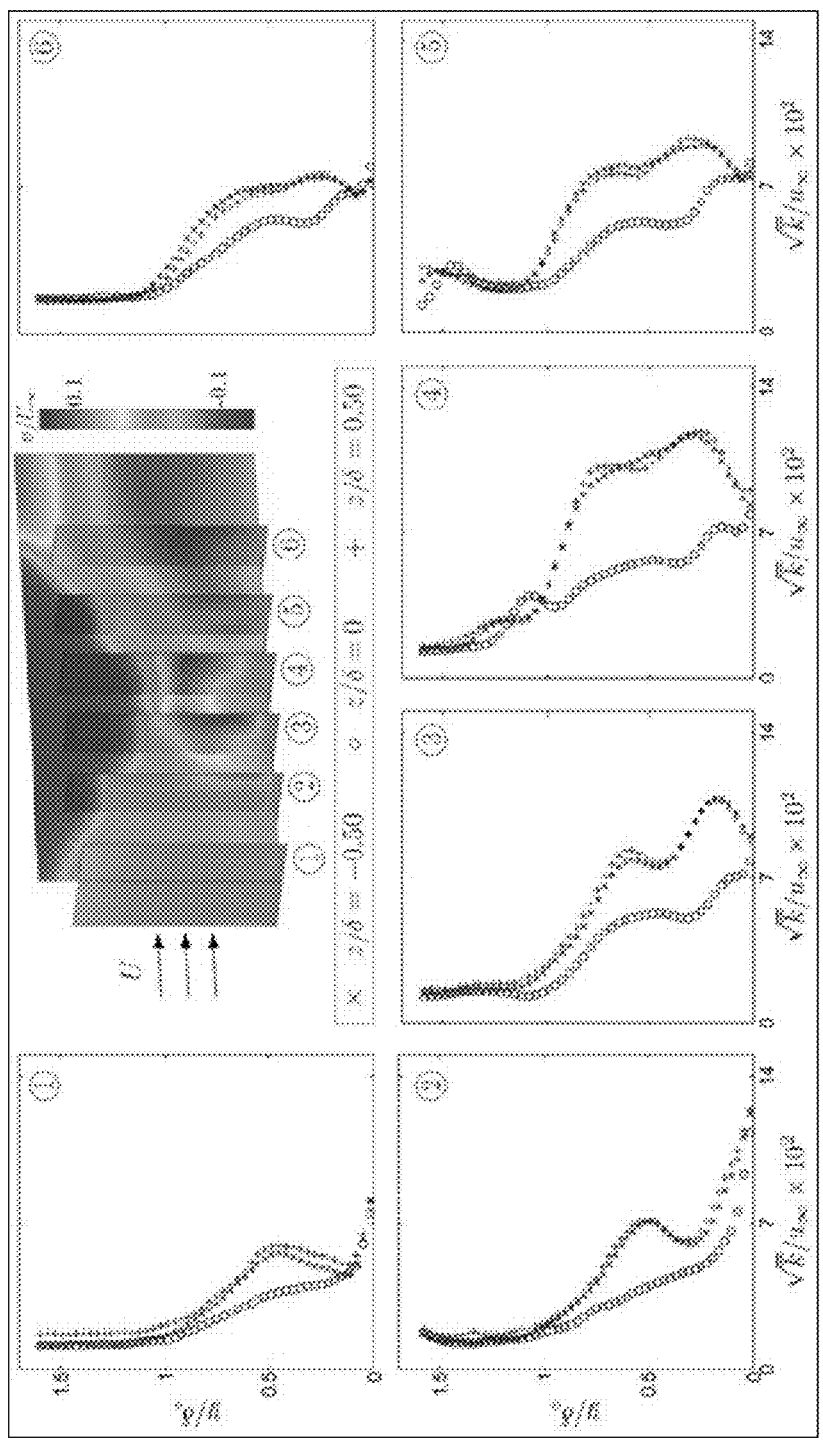

FIG. 32 illustrates the evolution of $\bar{k}$ through the vortex interaction region in this instance for an example application comprising a shock-boundary layer interaction with an incident shock wave that produces a flow deflection angle of $\theta$=12.0−deg and passive control via inverse micro-ramps located at $\chi/\delta_0$=−9.76. The six sampling locations correspond to 1: $\chi/\delta_0$=−3.6, 2: $\chi/\delta_0$=−2.9, 3: $\chi/\delta_0$=−2.3, 4: $\chi/\delta_0$=−1.7, 5: $\chi/\delta_0$=−1.1, and 6: $\chi/\delta_0$=−0.4. At top, colors show the $\bar{v}$ field throughout each plan and show the relative location of each plane.

Figure 33:
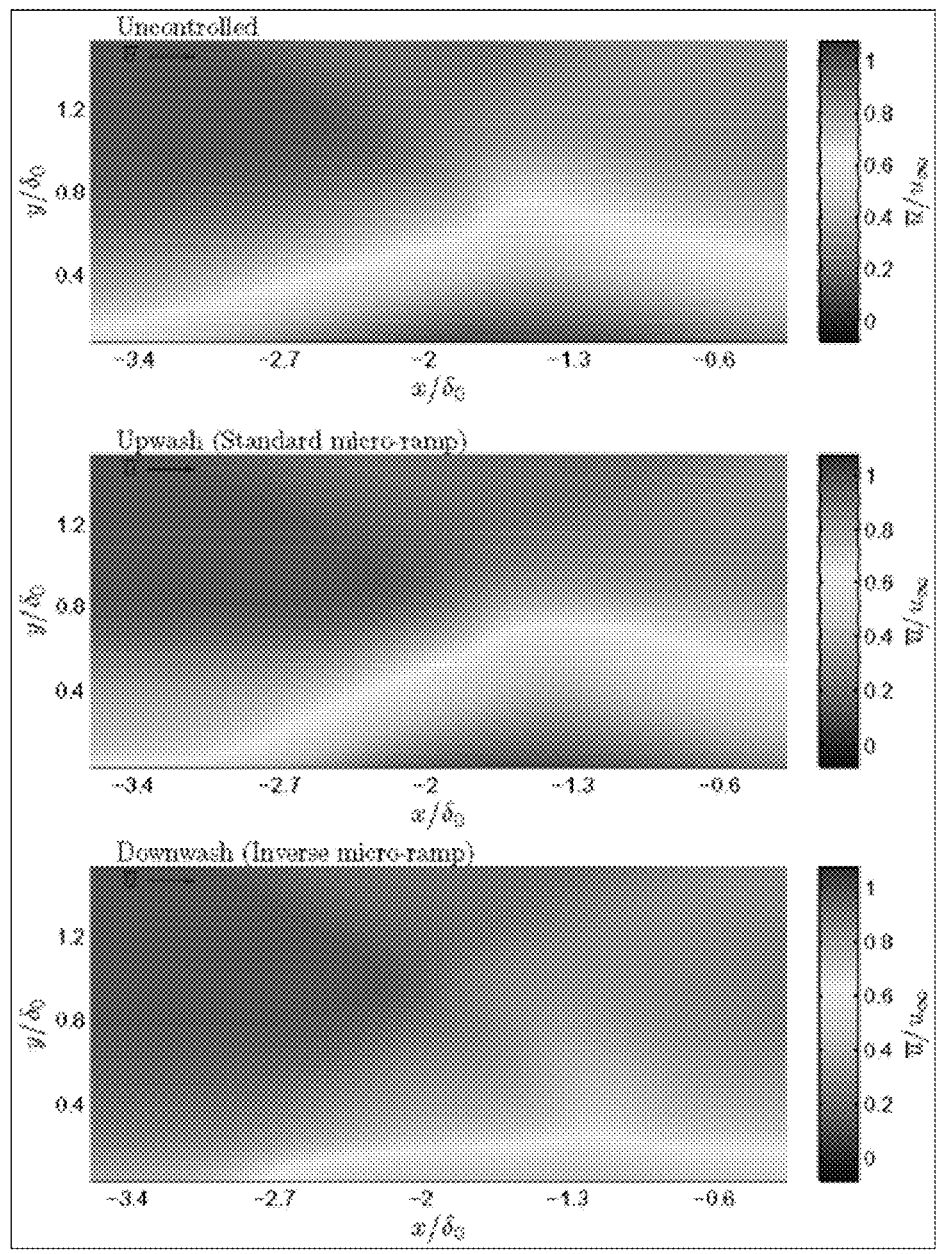

FIG. 33 illustrates the mean streamwise velocity $\bar{u}$ fields along the tunnel centerline from the uncontrolled interaction, the vortex-induced upwash region produced by the standard micro-ramp, and the vortex-induced downwash region produced by the inverse micro-ramp. All visualizations involve the $\theta$=12.0−deg flow deflection angle.

Figure 34:
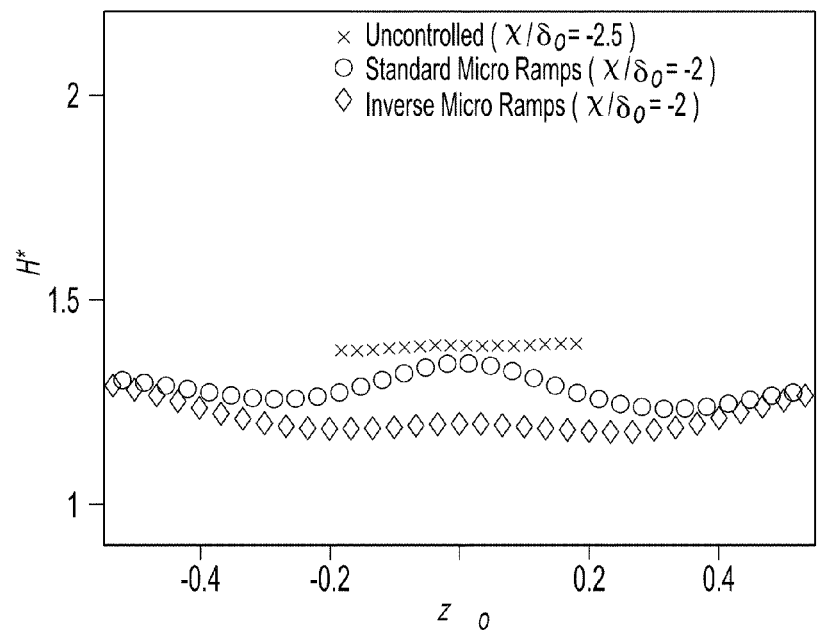

FIG. 34 illustrates the modified shape factor H* shown upstream of the $\theta$=7.75−deg interaction as a function of the spanwise coordinate, comparing the uncontrolled boundary layer with those controlled by the standard and inverse ramps.

Figure 35:
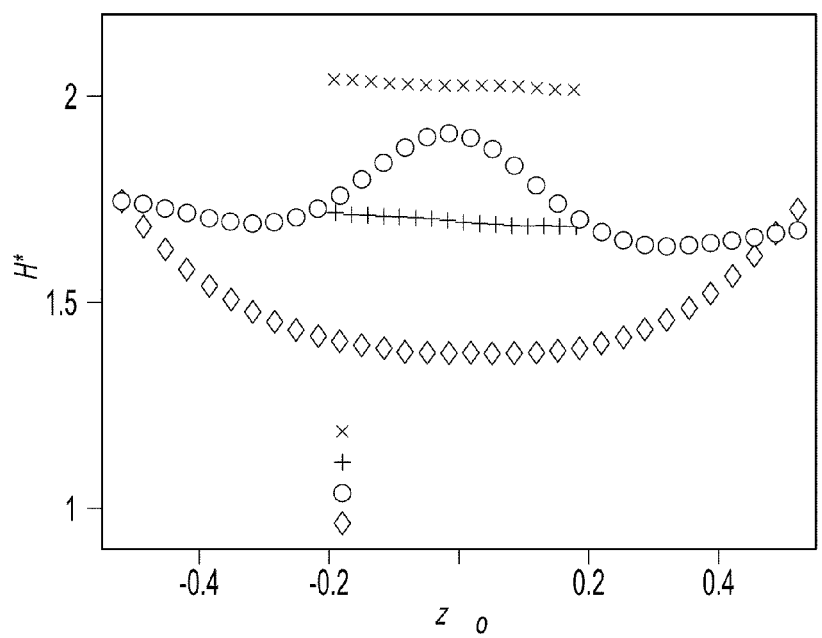

FIG. 35 illustrates the modified shape factor H* shown downstream of the $\theta$=7.75−deg interaction as a function of the spanwise coordinate, comparing the uncontrolled boundary layer with those controlled by the standard and inverse ramps.

Figure 36:
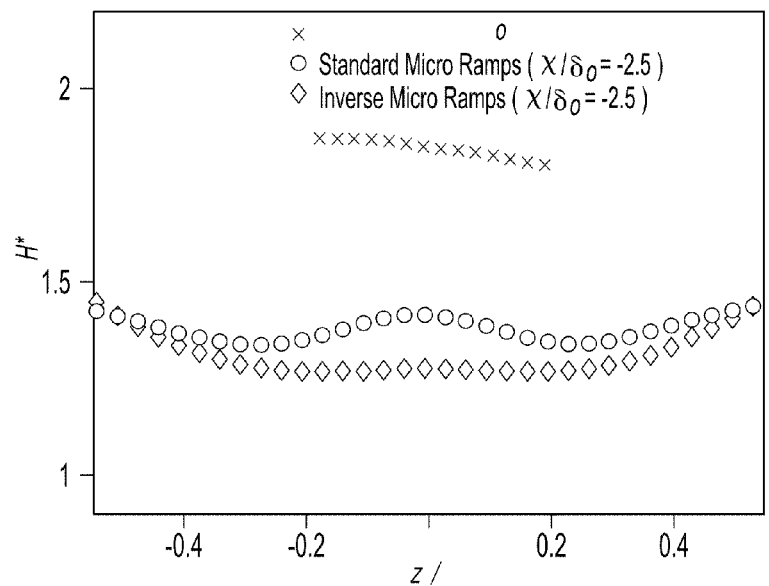

FIG. 36 illustrates the modified shape factor H* shown upstream of the $\theta$=10.0−deg interaction as a function of the spanwise coordinate, comparing the uncontrolled boundary layer with those controlled by the standard and inverse ramps.

Figure 37:
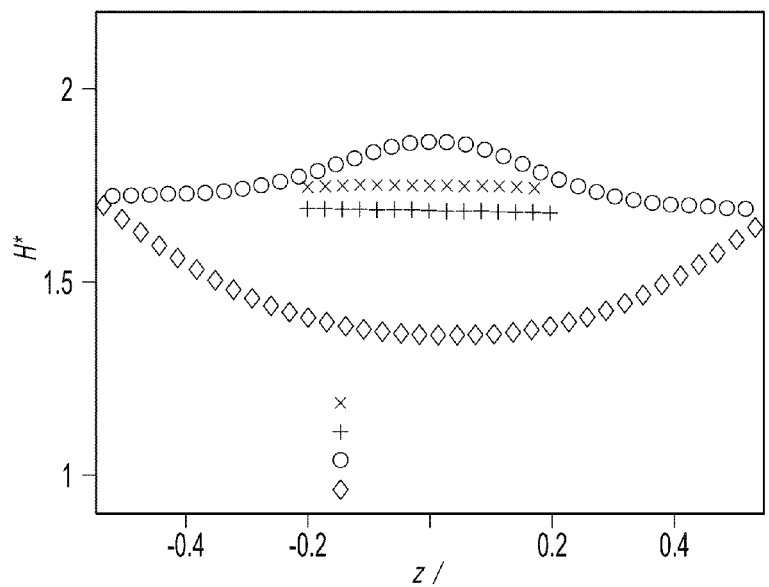

FIG. 37 illustrates the modified shape factor H* shown downstream of the $\theta$=10.0−deg interaction as a function of the spanwise coordinate, comparing the uncontrolled boundary layer with those controlled by the standard and inverse ramps.

Figure 38:
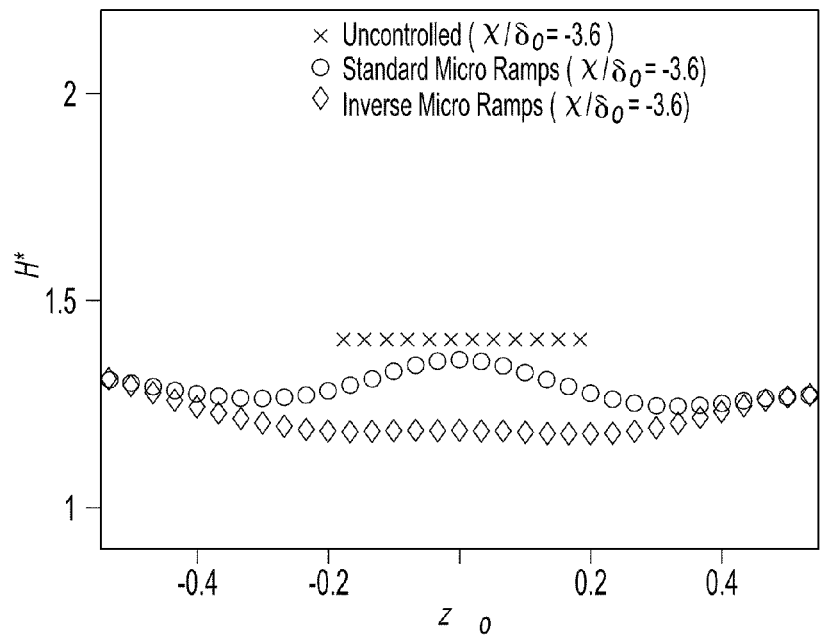

FIG. 38 illustrates the modified shape factor H* shown upstream of the θ=12.0–deg interaction as a function of the spanwise coordinate, comparing the uncontrolled boundary layer with those controlled by the standard and inverse ramps.

Figure 39:
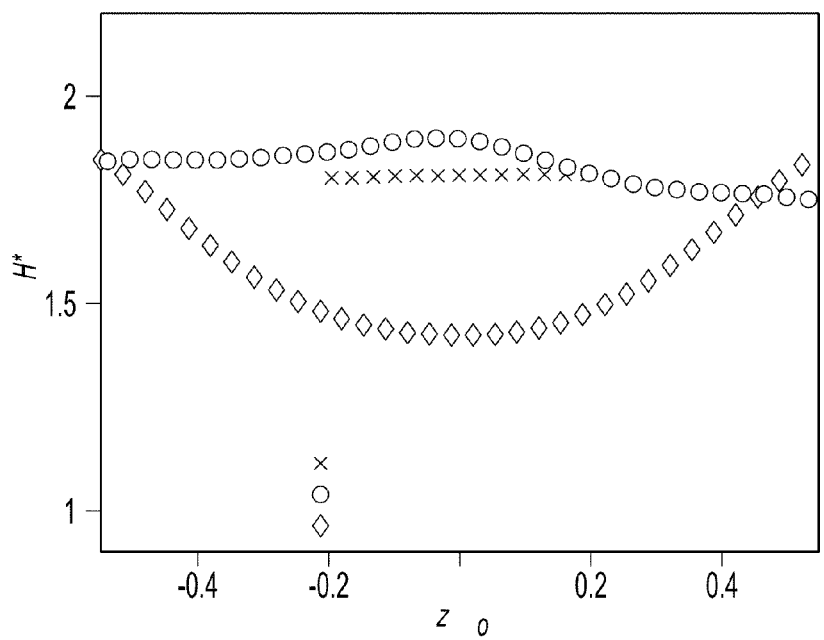

FIG. 39 illustrates the modified shape factor H* shown downstream of the θ=12.0–deg interaction as a function of the spanwise coordinate, comparing the uncontrolled boundary layer with those controlled by the standard and inverse ramps.

Corresponding reference numerals indicate corresponding parts throughout the several views of the drawings.

DETAILED DESCRIPTION

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
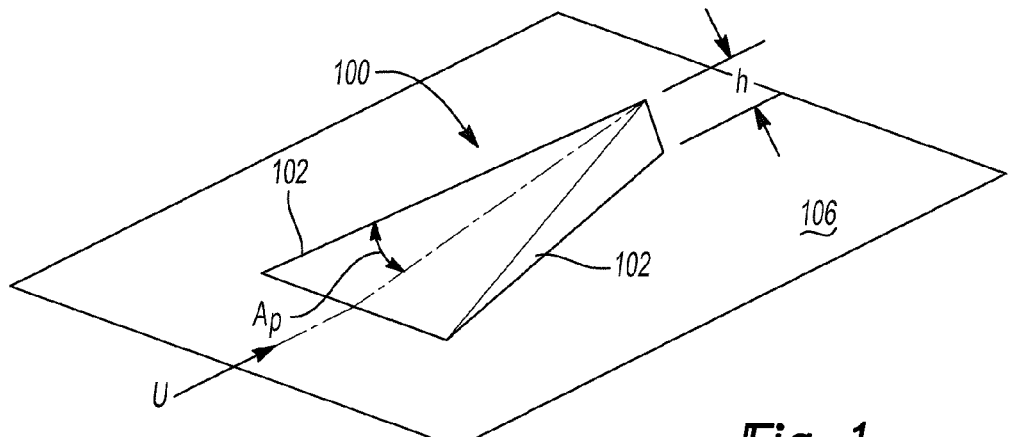
FIG. 1 illustrates a perspective view of micro ramps according to the prior art.
Figure 2:
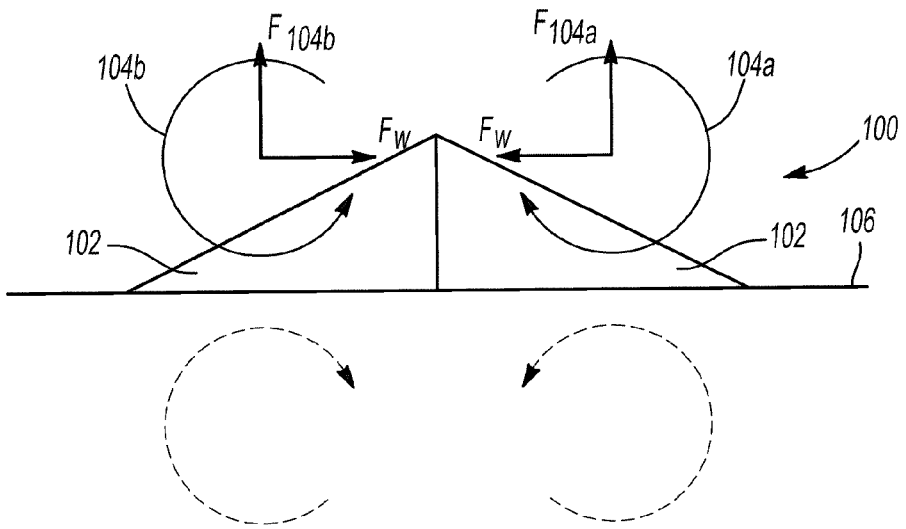
FIG. 2 illustrates an end view of the micro ramps according to FIG. 1 viewed from a downstream perspective looking upstream.

Prior art vortex generators, including the micro ramp design of the prior art (FIGS. 1-2), show promise under certain design conditions, with particular benefit coming from reductions in the peak spanwise-averaged displacement thickness. They provide means for passively controlling various aspects of boundary layers in a wide range of applications, including shock-boundary layer interactions (SBLI) and numerous others. Among such vortex generators, micro ramp designs of the prior art (FIGS. 1-2) are particularly noteworthy for their structural robustness, which provides notable advantages over other more fragile or complicated boundary layer control concepts. However, the beneficial effects of such micro ramp designs and other prior art vortex generators are comparatively modest, and they produce various detrimental effects that may make them unacceptable for certain applications. For these reasons, prior art vortex generators in general, and especially micro ramp vortex generators of the prior art, require substantial improvement of their efficiency and effectiveness.

The present teachings provide an alternative micro ramp design that produces a stream-wise vortex pair whose sense of rotation is opposite that of the standard micro ramp 100 (that is, counter-rotating vortices rotating opposite of the aforementioned standard design), and that preserves the appealing simplicity and robustness of the standard design. The new design is suitably termed the inverse micro ramp and generally designated at reference 10. Empirical results are provided, with a number of metrics suggesting considerably improved performance.

Figure 3:
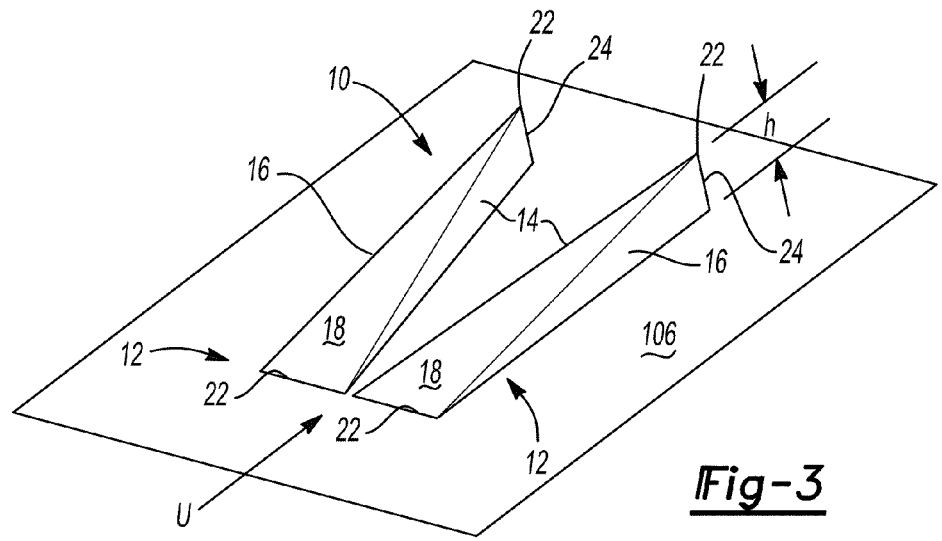
FIG. 3 illustrates a perspective view of micro ramps according to the principles of the present teachings.
Figure 4:
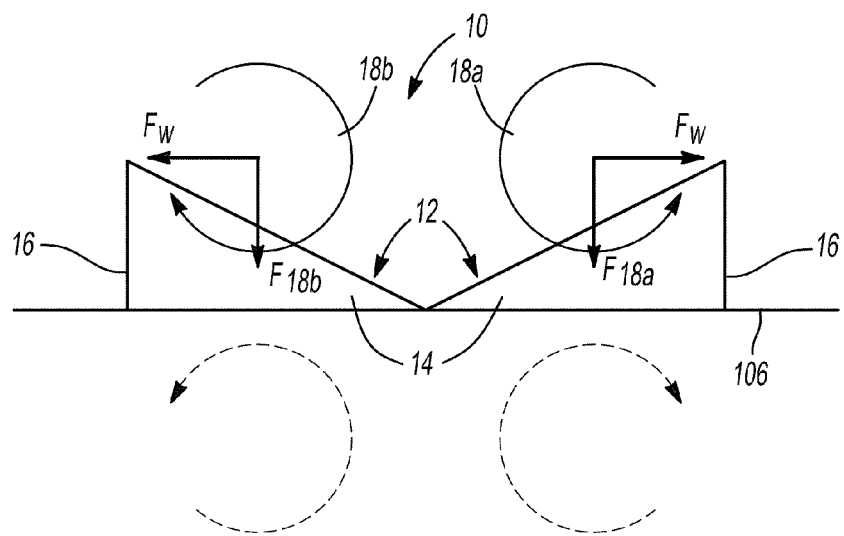
FIG. 4 illustrates an end view of the micro ramps according to FIG. 3 viewed from a downstream perspective looking upstream.

With particular reference to FIGS. 3-4, the inverse micro ramp design 10 of the present teachings is illustrated schematically from a perspective view (FIG. 3) and a downstream vantage looking upstream at the rearward angled faces of the feature (FIG. 4). Inverse micro ramp design 10 comprises a pair of ramp-like features 12 that together are used to achieve the advantages of the present teachings. Each of the pair of ramp-like features 12 is symmetrical and in mirrored relationship to the other.

Similar to the standard design, the incoming boundary layer U is initially deflected by ramp-like features 12 before passing over two angled dumps 14. In some embodiments, the faces 16 on the outward boundaries of the ramp-like features 12 are parallel with the streamwise flow velocity U, and the two angled dumps 14 form a "V" in the interior of the geometry. Note that the appealing characteristics of the standard ramps 100, particularly their simple and robust design, remain intact.

In some embodiments, each ramp-like feature 12 of inverse micro ramp 10 comprises a ramp face 18 being generally planar and extending from a first edge 20 at a height generally flush with wall 106 to a second edge or point 22 downstream of first edge 20 and inclined a height h above wall 106. Second edge or point 22 can be generally parallel to the plane of wall 106 (when in the form of an edge) and offset therefrom the height h. Although ramp face 18 is illustrated and described as being planar, it should be appreciated that other shapes are anticipated.

Angled dumps 14 and faces 16 of ramp-like feature 12 downwardly extend from ramp face 18 to wall 106. Angled dumps 14 and faces 16 are generally illustrated as being orthogonal to ramp face 18 (and, in some embodiments, wall 106). However, it should also be appreciated that in some embodiments angled dumps 14 and faces 16 may form an angle other than 90° relative to ramp face 18 or wall 106.

Still referring to FIG. 3, in some embodiments, ramp-like features 12 each further defines a trailing edge or surface 24 formed by the joining of angled dump 14 and the associated face 16.

Turning now to the behavior of the streamwise vortex pair as it propagates downstream using the inverse micro ramp design 10 of the present teachings, and in particular how the vortex-vortex interactions affect this path, attention should be directed to FIG. 4. It should be recognized that the vortex-vortex interaction of the present teachings produces a downwardly combining streamwise vortex pair opposite of the prior art design. Specifically, the effect of vortex 18a on vortex 18b, $F_{18a}$, is to push vortex 18b in the downward direction, and the same is true for the effect of vortex 18b on vortex 18a, $F_{18b}$. The effect of the wall 106 on the vortex pair 18a, 18b is deduced by considering an image vortex pair, which is a reflection of the real vortices across the wall, and shown in dotted lines in FIG. 4. These image vortices produce a further Biot-Savart induced interaction that causes the vortices 18a, 18b to move away from each other, thereby increasing the spacing between them. This effect in turn reduces the interdiffusion of the oppositely-signed vorticity that comprises these streamwise vortices 18a, 18b and in so doing acts to preserve their strengths as measured by their respective circulation. Both the direct effect produced by the Biot-Savart induced interaction between vortices 18a and 18b, and the indirect wall effect produced by Biot-Savart induced interaction of each of vortices 18a and 18b with its respective image vortex, act to increase the efficacy of the resulting streamwise vortices 18a, 18b in controlling the boundary layer.

In other words, the vortex pair 18a, 18b produced by these angled dumps 14 is shown schematically in FIG. 4. As a result of their sense of rotation, the vortex-vortex interaction and the effect of the wall force the vortices to remain separated from each other and to remain in close proximity to the wall. Thus such a design enables the vortex strength to persist further downstream of the features, with the spanwise region controlled by the individual features being larger than with the standard design. Therefore, not only do the inverse micro ramps 10 perform their desired function better than the standard ramps 100, but they do so with fewer individual elements because of their improved effectiveness downstream. Ultimately, this can be translated into reduced drag-related losses, reduced thermodynamic performance losses, and reduced fabrication expenses for the same or greater beneficial effect on controlling the boundary layer.

Figure 5A:
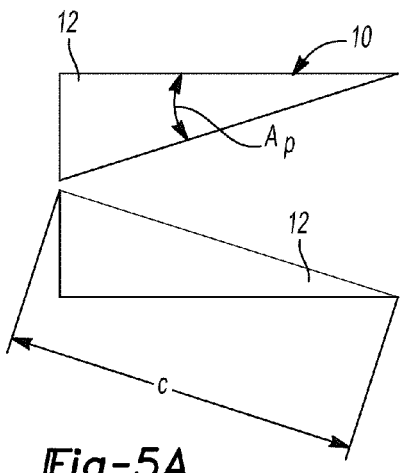
FIG. 5(a) illustrates a plan view of the micro ramps according to FIG. 3.
Figure 5B:
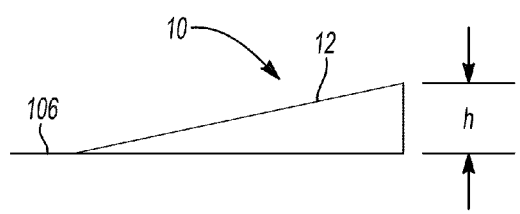
FIG. 5(b) illustrates a side view of the micro ramps according to FIG. 3.
Figure 6A:
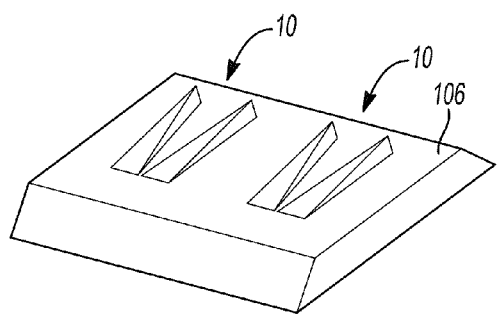
FIG. 6(a) illustrates a perspective view of a pair of the micro ramps according to FIG. 3.
Figure 6B:
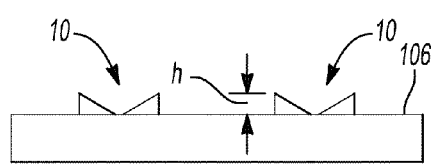
FIG. 6(b) illustrates an end view of a pair of the micro ramps according to FIG. 3.
Figure 6C:
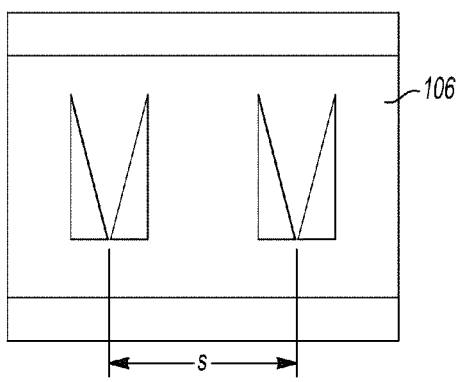
FIG. 6(c) illustrates a plan view of a pair of the micro ramps according to FIG. 3.

The nomenclature used for the defining dimensions of the inverse micro ramp 10 is shown in FIGS. 5 and 6, and is analogous to that used for the standard micro ramp design 100. Each half of the inverse micro ramp 10 has hypotenuse c, interior angle $A_p$, height h, and inter-feature spacing s.

Comparison of Inverse Micro Ramp Design to Conventional Structures

To assist in providing relevant comparisons to the previously described standard micro ramp, while also illustrating certain elements of an optimal configuration, the following further nonlimiting illustration is provided. For the sake of this illustration, we maintain three of the defining dimensions constant in the inverse micro ramp design 10, that is, the nominal flow deflection angle, the ratio c/h, and the upstream location $x_R$. The flow deflection angle, β, is given by $$B = \sin^{-1}\left(\frac{h}{c\cos A_p}\right), \quad (1)$$

thus leaving two free design variables, h and $A_p$. These are chosen through various considerations and, for the present discussion, are $A_p$=14–deg and h=3 mm. These choices increase the frontal area of the ramps by 36% as compared to the standard ramps 100, however they effectively elongate inverse micro ramps 10 so that the angled dumps 14 are aligned more closely with the streamwise direction. Then by extension, the axes of the vortices created by the dumps are also aligned more closely with the streamwise direction and more effectively perform their intended function.

Comparison of Vorticity

For the sake of this discussion the performances of the standard micro ramps 100 and the inverse micro ramps 10 are evaluated and compared as they pertain to a specific instance of passive vortex generators for boundary layer control, in this case control of shock-boundary layer interactions. However, it should be appreciated that the principles of the present teachings should not be regarded as being limited to shock-boundary layer interactions. The following shock-boundary layer interaction discussion is merely illustrative of the principles of the present teachings.

Spanwise imaging planes are used to visualize the flow field and the streamwise vortices contained therein. FIG. 7 shows the streamwise vorticity fields $\overline{\omega}_x(y, z)$ produced by the standard micro ramp 100 (FIG. 7(a)) and the inverse micro ramp 10 (FIG. 7(b)) at the same downstream location, in this case upstream of a θ=7.75–deg interaction at $x/\delta_0$=−2.5. The inverse micro ramp design 10 produces vortices with over twice the peak vorticity contained in those produced by the standard ramps 100. Additionally, the vortices produced by the inverse micro ramps 10 are located considerably farther apart and deeper in the boundary layer, offering qualitative but convincing evidence that the design objectives of the present teachings are realized. In what follows, these inferences are quantitatively assessed.

FIGS. 8-10 illustrate the evolution of the streamwise vortex pair through the interaction region for 6=7.75–deg, 10.0–deg, and 12.0–deg shock strengths, respectively. FIGS. 11-13 show profiles of the evolution of vorticity through each of the three interactions at locations corresponding approximately to the centers of the vortices in the streamwise pair, in this case at z/δ=±0.4. Comparing the profiles upstream of the shock with those for the standard micro ramp, shown previously in FIGS. 14-16, one identifies a factor of 2.3 increase in peak vorticity produced by the inverse design. Additionally, within the available field-of-view, the circulation Γ produced by the inverse micro ramps 10 is 1.8 times greater than that produced by the standard micro ramps 100. Note additionally that this comparison represents a lower bound, as a significant contribution to the total circulation is clipped from the field-of-view, as is evident in FIG. 7b. The persistence of the vorticity through the interaction is shown via the normalized circulation in FIG. 17. Here, the pre- and post-interaction circulation is virtually unaltered for both the θ=7.75-deg and θ=10.0-deg interactions, while only in the θ=12.0-deg interaction are the streamwise vortices forced together, negating their associated circulation. This is in contrast to the results from the standard micro ramp shown in FIG. 18, where the vorticity was negated in both the θ=10.0-deg and 12-deg interactions.

It is apparent from FIG. 7, and also from FIGS. 8-13, that the overall vorticity produced by the inverse micro ramps 10 is situated deeper in the boundary layer and at larger |z| values as compared to the vorticity produced by the standard design. These observations are quantified through calculation of the vorticity centroids, shown in FIG. 19 for all three interactions, with solid symbols representing vortices produced by the inverse micro ramps 10 and open symbols representing vortices produced by the standard micro ramp design 100. The vortices produced by inverse micro ramps 10 are separated in the spanwise direction by an average of $0.83\delta_0$, compared to $0.37\delta_0$ for those produced by the standard ramps 100. In the wall-normal direction, the vortex pair produced by the inverse micro ramps 10 have centroids at $y/\delta_0=0.22$, while those produced by the standard ramps 100 have centroids at $y/\delta_0=0.37$. It should be understood that the latter average was computed after excluding the highest two points in FIG. 19.

Thus the inverse micro ramp design 10 provides an approximately two-fold increase in both peak vorticity and spreading distance, accompanied by an approximately two-fold decrease in the wall-normal location. These compelling results are summarized in Table 1.

TABLE 1

Comparison of magnitudes and locations of the streamwise vortex pairs produced by the standard and inverse micro ramp designs.

| | $\max(w_x/(u_\infty/\delta_0))$ | $\Delta z_{wc}/\delta_0$ | $y_{wc}/\delta_0$ |
|---|---|---|---|
| Standard Micro Ramp | 0.23 | 0.37 | 0.37 |
| Inverse Micro Ramp | 0.52 | 0.83 | 0.22 |
| Factor Increase/Decrease | 2.3 | 2.2 | 1.7 |

Effect on Mean Velocity Fields

With the sense of vorticity produced by the ramps now reversed, the vortex-induced downwash now occurs along the tunnel centerline. The evolution of the resulting streamwise velocity fields $\bar{u}(y,z)$ are shown in spanwise planes in FIGS. 20-22 for the θ=7.75-deg, 10.0-deg, and 12.0-deg deflection angles, respectively. The powerful vortex-induced downwash along the centerline convects high velocity air deep into the boundary layer, and enables a core of such high-energy fluid to pass through the interaction relatively unaffected by the shock. Conversely, in the vortex-induced upwash regions which occur at larger |z| values, the low velocity fluid originally in the boundary layer is convected toward the free stream. One might note, at least qualitatively, that while the effect on the streamwise velocity in the downwash region is considerably greater in the present case as compared to the standard micro ramps 100, the effect in the upwash regions appear comparable.

Further insight into this regard is provided through inspection of the streamwise velocity profiles, offered in FIGS. 23-25 for all three shock strengths. As is known for standard micro ramp cases, the centerline and off-centerline profiles have equal velocities at large $y/\delta_0$ values, deviate in the central region of the boundary layer, and then approach equal values in the near wall region. Owing to the two-fold increase in vortex strength, the deviations in the present case are substantially larger than for the standard micro ramps.

Comparison between the two controlled boundary layers and the uncontrolled boundary layer is offered in FIG. 26 at the $x/\delta_0=-1.1$ location in the θ=10.0-deg interaction. Caution is encouraged when comparing the vortex-induced upwash regions, denoted by the circular points, since in the case of the inverse micro ramps 10 the full degree of upwash has not been resolved. The flow is relatively unaffected by the method of control for $y/\delta_0 \gtrsim 0.75$, with large variation being observed closer to the wall. Using the standard micro ramps 100, the benefit provided by the vortex-induced downwash region is approximately equal to the loss produced by the corresponding upwash region. With much larger vorticity magnitude, as produced by the inverse micro ramps 10, the gain in the downwash region of the vortex pair significantly outweighs any loss in the presently resolved upwash region.

Comparison of Mean Integral Relations

These observations are seen more completely through the spanwise measurements of the modified shape factors H*. FIGS. 34-39 show these measurements for the uncontrolled and controlled boundary layers in locations upstream (FIGS. 34, 36 and 38) and downstream (FIGS. 35, 37 and 39) of the interaction for all three shock strengths. Recall that in general a smaller shape factor is indicative of high momentum being located close to the wall and therefore represents a boundary layer that is less susceptible to detachment. Note also that H*=1 is the lower bound, and describes the case of a uniform velocity profile everywhere equal to the free stream velocity $u_\infty$. Finally, one should recall that due to the lack of a uniform free stream in the presence of an incident shockwave, the numerical values of H* are rendered somewhat moot and therefore comparison between figures is irrelevant. Instead, accurate inferences can only be made through comparisons contained within each individual figure.

With these precautions in mind, the effect of the inverse micro ramps 10 is substantial for all shock strengths. The effects on the boundary layer upstream of the present teachings are comparable to the effects of the standard micro ramp design 100. Downstream of the interaction, however, the inverse micro ramps 10 provide a substantial reduction in the shape factor within the available field of view. Additionally, while the standard micro ramp design 100 provides little or no benefit to the shape factor for the θ=10.0-deg and 12.0-deg interactions, the inverse micro ramps 10 provide substantial benefit even in these stronger interactions.

Comparison of Net Displacement Thicknesses

One quantification of the net effect of the micro ramps 10 is the spanwise-averaged displacement thickness $\langle \delta^* \rangle$, which can be investigated as a function of the streamwise coordinate. For all incident shock strengths, it has been found that the net displacement thickness is reduced by the inverse micro ramps 10 at all streamwise locations, further demonstrating the potential utility of the design. Table 2 shows the maximum net displacement thickness for each interaction together with the percent reduction provided by the two boundary layer control techniques. The results suggest the inverse micro ramp design 10 effectively reduces the peak boundary layer thickness through the SBLI by as much as 34% over the uncontrolled interaction. Even in the strongest interaction a 17% reduction is achieved, demonstrating a four-fold improvement over the reduction produced by the standard micro ramp design 100.

TABLE 2

Maximum displacement thicknesses through each interaction, showing also the net reductions produced by the standard and inverse micro ramps.

|  | θ = 7.75-deg | θ = 10.0-deg | θ = 12.0-deg |
| --- | --- | --- | --- |
| Blank | 2.8 — | 3.9 — | 4.3 — |
| S. Micro Ramp | 2.2 (22%) | 3.4 (12%) | 4.1 (4%) |
| I. Micro Ramp | 1.9 (34%) | 3.0 (21%) | 3.6 (17%) |

Effects of Vortex-Induced Upwash and Downwash

FIG. 27 shows the kinetic energy fields $\bar{K}$ (x, y) for the three interactions. The $\bar{K}$ (x,y) fields are rather similar in the uncontrolled and upwash regions, with the elevated kinetic energy levels being a result of an unsteady free shear layer that exists between the low velocity fluid at the shock foot and the high speed incoming stream. In the vortex-induced downwash region, the kinetic energy is dramatically reduced in the entirety of the field except in the region immediately near the wall. This suggests that the shear layer, no longer unsteady, remains attached to the wall allowing for the overall interaction to be quite steady in this region.

FIGS. 27-29 indicate that the fluctuations of the interaction are dramatically reduced in the presence of a sufficiently strong downwash. This is substantiated further in FIG. 30-32, which show profiles of the kinetic energy $\bar{K}$ for the three interactions. In the upwash regions the turbulence levels are comparable in size and scope to those from the uncontrolled interactions, but in the downwash regions the fluctuation levels are reduced. This is especially true in the θ=12.0-deg interaction in FIG. 32, where the effect of the downwash region is dramatic.

The low fluctuation levels in the downwash regions result from elimination of any instantaneous recirculation bubbles that might appear in the interaction and thus the otherwise free shear layer is constrained at the bottom wall boundary. Thus, extrapolating this result across a large span, the vortex generator arrays will produce an SBLI with alternating regions of fully attached flow in the vortex-induced downwash regions and intermittent recirculating or detached flow in the vortex-induced upwash regions. By extension, then, the potentially large recirculation structure, which has been demonstrated experimentally many times, should be divided into much smaller cells, and it would be expected that the downstream dimension of such cells would be on the order of their spanwise dimension. Similarly, the previously large-scale oscillations associated with the large recirculation zone should be reduced to localized effects with correspondingly reduced amplitudes.

Interpretation of Results

As previously noted, vortex generator arrays will produce regions of alternating vortex-induced upwash and downwash across the span. Using shock boundary layer interactions as one of many flow-fields suited for passive control by micro-ramps, the discussion herein, and particularly FIGS. 34-39 and FIG. 33, showed that the vortex-induced downwash produced by suitably designed micro ramp vortex generators can dramatically improve the boundary layer profile as it evolves through regions of strong adverse pressure gradients. In the complementary upwash regions, meanwhile, the effects of the vortex generators are not significantly worse than in an uncontrolled scenario. When these effects are integrated across the span, the net effects of the incident shock on the boundary layer can be considerably reduced. Table 2 summarizes this quantitatively.

Effects of the micro ramp vortex generators on the stability of shock-boundary layer interaction can also be inferred. FIGS. 27-32 indicate that the fluctuations of the interaction are dramatically reduced in the presence of a sufficiently strong downwash. In the upwash regions the turbulence levels are comparable in size and scope to those from the uncontrolled interactions, but in the downwash regions the fluctuation levels are reduced. The low fluctuation levels in the downwash regions result from elimination of any instantaneous recirculation bubbles that might appear in the interaction and thus the otherwise free shear layer is constrained at the bottom wall boundary, thus reducing large-scale oscillations of the interaction.

Accordingly, it should be appreciated that the present teachings provide numerous beneficial aspects, including approximately two-fold improvements over the standard design in several key metrics—namely the maximum vorticity, total circulation, spanwise separation, and the wall normal location. The resulting effects on the flow field make the inverse micro ramps 10 strong candidates for augmenting or eliminating active boundary layer control techniques and for achieving the same or greater beneficial effects in passively controlling a boundary layer with lower performance penalties while maintaining other practical considerations than is possible with prior art passive vortex generators.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A passive boundary layer control element device for positioning on a surface used to control the flow of a fluid medium from an upstream location to a downstream location relative to said device, said device comprising:

a first ramp feature upstanding from the surface, said first ramp feature having an inclined ramp face, said inclined ramp face being substantially triangular in shape defining a base edge and a pair of side edges extending from said base edge to an apex, said base edge being generally flush with the surface and said apex being generally spaced apart from the surface by a height, said base edge being upstream relative to said apex, a pair of sidewalls extending between said pair of side edges and the surface;

a second ramp feature upstanding from the surface, said second ramp feature having a inclined ramp face, said inclined ramp face being substantially triangular in shape defining a base edge and a pair of side edges extending from said base edge to an apex, said base edge being generally flush with the surface and said apex being generally spaced apart from the surface by a height, said base edge being upstream relative to said apex, a pair of sidewalls extending between said pair of side edges and the surface;

said first ramp feature and said second ramp feature being spaced relative to each other to induce a pair of vortices generally aligned with a direction of the flow of the medium, each of said pair of vortices defining a streamwise rotation that results in a net Biot-Savart induced force vector acting on each of said pair of vortices directed toward the surface.

2. The device according to claim 1 wherein said height of said first ramp feature and said height of said second ramp feature are sufficient such that said apex of said first ramp feature and said apex of said second ramp feature extend within a boundary layer of the flow of the medium.

3. The device according to claim 1 wherein said inclined ramp face of said first ramp feature and said inclined ramp face of said second ramp feature are each right triangles.

4. The device according to claim 1 wherein said inclined ramp face of said first ramp feature and said inclined ramp face of said second ramp feature are in mirrored relationship to each other.

5. The device according to claim 1 wherein at least one of said pair of sidewalls of said first ramp feature extending between said pair of side edges and the surface is generally perpendicular to the surface.

6. The device according to claim 1 wherein said predetermined height of said first ramp feature and said predetermined height of said second ramp feature is sufficient to transfer high-momentum fluid toward the surface in such a way as to alter the shape of the velocity profile within the boundary layer and thereby avoid or delay separation or alter other properties of the boundary layer.

7. A passive boundary layer control element device for positioning on a wall to control the flow of a medium from an upstream location to a downstream location relative to said device, said device comprising:

a pair of ramp features upstanding from the wall and in mirrored symmetry, said pair of ramp features each having an inclined ramp face, each of said inclined ramp faces being substantially triangular in shape defining a base edge and a pair of side edges extending from said base edge to an apex, said base edge being generally flush with the wall and said apex being generally spaced apart from the wall a predetermined height, said base edge being upstream relative to said apex, a pair of sidewalls extending between said pair of side edges and the wall;

each of said pair of ramp features being spaced relative to the other to induce a pair of vortices generally aligned with a direction of the flow of the medium, each of said pair of vortices defining a streamwise rotation that results in a net Biot-Savart induced force vector acting on each of said pair of vortices directed toward the wall.

8. The device according to claim 7 wherein said predetermined height of said pair of ramp features is sufficient such that at least a portion of said apex of said pair of ramp features extends within a boundary layer of the flow of the medium.

9. The device according to claim 7 wherein said inclined ramp faces of said pair of ramp features are each right triangles.

10. The device according to claim 7 wherein at least one of said pair of sidewalls of said pair of ramp features extending between said pair of side edges and the wall is generally perpendicular to the wall.

11. The device according to claim 7 wherein said predetermined height of said pair of ramp features is sufficient to transfer high-momentum fluid toward the wall in such a way as to alter the shape of the velocity profile within the boundary layer and thereby avoid or delay separation or alter other properties of the boundary layer.

* * * * *

UNITED STATES PATENT AND TRADEMARK OFFICE
CERTIFICATE OF CORRECTION

PATENT NO. : 8,528,601 B2  
APPLICATION NO. : 12/748699  
DATED : September 10, 2013  
INVENTOR(S) : Dahm et al.

Page 1 of 1

It is certified that error appears in the above-identified patent and that said Letters Patent is hereby corrected as shown below:

In the Specification

Column 3, line 48, delete "a" and insert --at--.

Column 3, line 61, after "top,", delete "p,".

Column 3, line 61, delete "v" and insert -- $\overline{V}$ --.

Column 3, line 64, delete "tux" and insert -- $\overline{\omega_x}$ --.

Column 6, line 7, delete "$S_{xy}$" and insert -- $\overline{S_{xx}}$ --.

Column 10, line 53, delete "6=7.75" and insert --θ=7.75--.

Signed and Sealed this  
Third Day of March, 2015

Michelle K. Lee  
*Deputy Director of the United States Patent and Trademark Office*